(12) United States Patent
Tamaki et al.

(10) Patent No.: US 8,031,310 B2
(45) Date of Patent: Oct. 4, 2011

(54) LIQUID CRYSTAL DISPLAY WITH ORTHOGONAL ORIENTATION AND METHOD OF MANUFACTURING THE SAME

(75) Inventors: Masaya Tamaki, Kanagawa (JP);
Hidemasa Yamaguchi, Kanagawa (JP);
Hironao Tanaka, Kanagawa (JP);
Motoharu Nishida, Kanagawa (JP)

(73) Assignee: Sony Corporation, Tokyo (JP)

( * ) Notice: Subject to any disclaimer, the term of this patent is extended or adjusted under 35 U.S.C. 154(b) by 464 days.

(21) Appl. No.: 12/138,951

(22) Filed: Jun. 13, 2008

(65) Prior Publication Data

US 2009/0009703 A1 Jan. 8, 2009

(30) Foreign Application Priority Data

Jul. 3, 2007 (JP) .................. 2007-174821
Jul. 25, 2007 (JP) .................. 2007-193307

(51) Int. Cl.
*G02F 1/1337* (2006.01)
*G02F 1/141* (2006.01)

(52) U.S. Cl. ........ 349/123; 349/132; 349/133; 349/134; 349/135; 349/136

(58) Field of Classification Search .......... 349/123–129, 349/141–142, 132–138
See application file for complete search history.

(56) References Cited

FOREIGN PATENT DOCUMENTS

| JP | 03-219220 | | 9/1991 |
| JP | 05-088177 | | 4/1993 |
| JP | 08-114804 | | 5/1996 |
| JP | 11174456 | * | 7/1999 |
| JP | 11-218763 | | 8/1999 |
| JP | 2000-105380 | | 4/2000 |
| JP | 2000206532 | * | 7/2000 |
| JP | 2001042331 | * | 2/2001 |
| JP | 2003315804 | * | 11/2003 |
| JP | 2006195111 | * | 7/2006 |

OTHER PUBLICATIONS

Minoru Nakamura and Mitsuru Ura; Alignment of nematic liquid crystals on ruled grating surfaces; J. Appl. Phys 52(1); Jan. 1981.
Yasuyuki Ohta, et al., "Surface Azimuthal Anchoring Energy between the Grating Surface and Nematic Liquid Crystal Layer Studies by Finite Element Method," Japanese Journal of Applied Physics vol. 43, No. 7A, 2004, pp. 4310-4311.
Minoru Nakamura, et al., "Alignment of Nematic Liquid Crystals on Ruled Grating Surfaces"; J. Appl. Phys. 52(1), Jan. 1981.

* cited by examiner

*Primary Examiner* — Hoan Nguyen
(74) *Attorney, Agent, or Firm* — SNR Denton US LLP

(57) ABSTRACT

Disclosed herein is a liquid crystal display including substrates, a liquid crystal, an orientation layer, and electrodes. The orientation layer includes a base layer having a principal surface provided with a plurality of grooves in parallel, and a coating film covering the principal surface. The coating film has a horizontally orienting ability to orient in parallel the molecular major axes of the liquid crystal molecules in the condition where no voltage is impressed on the principal surface. The grooves each extend along a predetermined direction, and are arrayed repeatedly at a given pitch along the direction orthogonal to the predetermined direction.

11 Claims, 19 Drawing Sheets

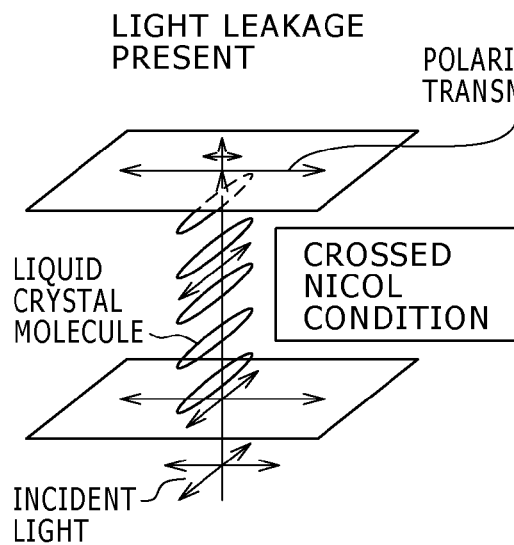
FIG.5A
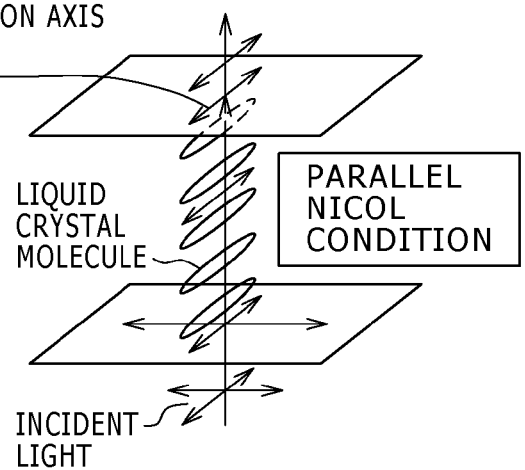
FIG.5B
FIG.6
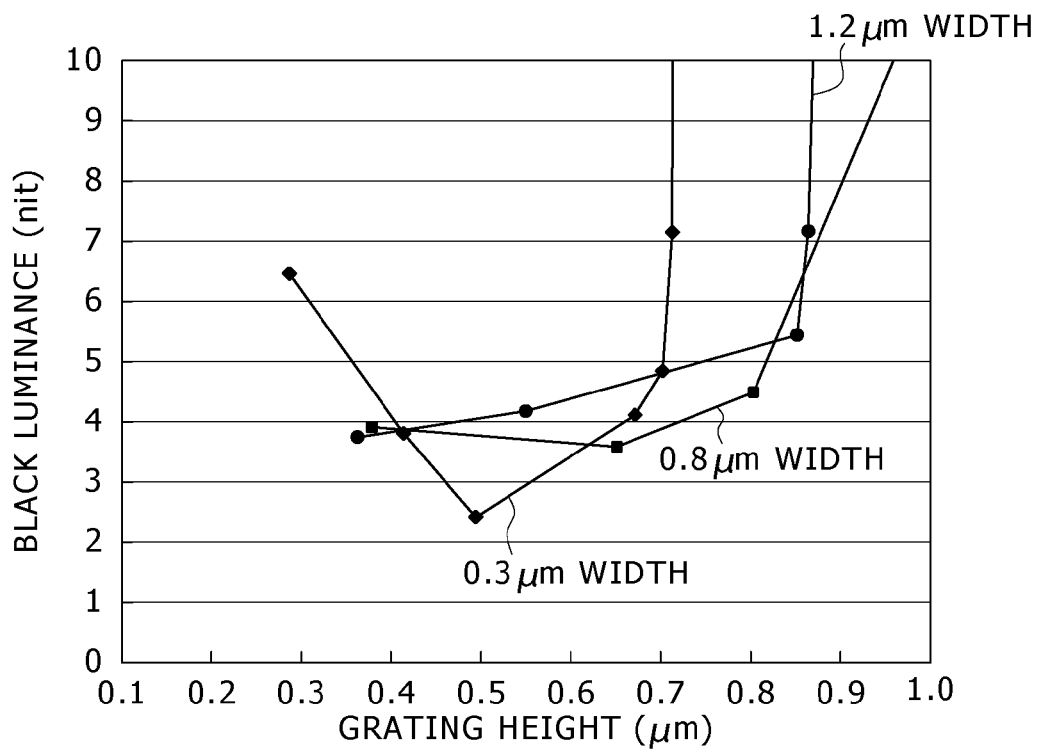

| | NOVEL GRATING ORIENTATION METHOD |
|---|---|
| OPTICAL MICRO-PHOTOGRAPH (CROSSED NICOL CONDITION) |  |
| TEST CELL CONTRAST | 700 |

| | GRATING ORIENTATION METHOD OF THE PAST |
|---|---|
| OPTICAL MICRO-PHOTOGRAPH (CROSSED NICOL CONDITION) |  |
| TEST CELL CONTRAST | 130 |

| | NOVEL GRATING ORIENTATION METHOD |
|---|---|
| OPTICAL MICRO-PHOTOGRAPH (CROSSED NICOL CONDITION) |  |
| TEST CELL CONTRAST | 700 |

| | GRATING ORIENTATION METHOD OF THE PAST |
|---|---|
| OPTICAL MICRO-PHOTOGRAPH (CROSSED NICOL CONDITION) |  |
| TEST CELL CONTRAST | 130 |

# LIQUID CRYSTAL DISPLAY WITH ORTHOGONAL ORIENTATION AND METHOD OF MANUFACTURING THE SAME

CROSS REFERENCES TO RELATED APPLICATIONS

The present invention contains subject matter related to Japanese Patent Applications JP 2007-174821 and 2007-193307 filed in the Japan Patent Office on Jul. 3, 2007 and Jul. 25, 2007 respectively, the entire contents of which being incorporated herein by reference.

BACKGROUND OF THE INVENTION

1. Field of the Invention

The present invention relates to a liquid crystal display and a method of manufacturing the same, and is applicable to various liquid crystal modes such as TN (Twisted Nematic), ECB (Electrically Controlled Birefringence), STN (Super Twisted Nematic), IPS (In-Plane Switching), FFS (Fringe Field Switching), etc. According to the present invention, the surface on the lower side of an orientation film is formed in a grooved shape to provide the orientation film with an orienting ability in a specified direction, thereby realizing a higher productivity, a more satisfactory orientation control force for a liquid crystal, and a higher image quality, as compared to those obtained according to the related art.

2. Description of the Related Art

In the past, in liquid crystal display panels of various liquid crystal modes such as TN, ECB, STN, IPS, FFS, etc., the liquid crystal molecules are oriented in a fixed direction by an orienting treatment, and a variety of techniques have been proposed for carrying out the orienting treatment.

The rubbing method as one of the orienting treatments is the most frequently used method, in which an orientation film composed of a film of a polymer such as a polyimide is formed on a transparent electrode, and thereafter the orientation film is rubbed in a fixed direction by a roller fitted with a cloth or the like on the surface thereof, whereby an orienting ability is imparted to the orientation film. The rubbing method, however, has the problem that the surface of the orientation film may be stained by deposition of debris generated upon rubbing, and that the TFTs (Thin Film Transistors) on the panel may be broken due to generation of static electricity.

The so-called grating method as an orienting treatment method substituting for the rubbing method is a method in which the surface of a substrate is processed to form a grating (grooves), and the elastic strain arising from the grating is utilized to orient the molecules of a liquid crystal. In the grating method, the liquid crystal molecules are oriented in the direction parallel to the grating in which the elastic free energy is most stabilized.

In relation to the grating method, M. Nakamura et al., J. Appl. Phys., 52, 210 (1981) proposes a method in which a photosensitive polymer layer is irradiated with light to form a grating in the form of straight lines arranged at a fixed interval. In addition, Japanese Patent Laid-open No. Hei 11-218763 proposes a method in which a photo-polymerizable monomer on a substrate is irradiated with light to form a grating-formed orientation film. Besides, Japanese Patent Laid-open No. 2000-105380 proposes a method in which by application of a technique of transfer, a resin coating film on a substrate surface is provided with a grating-like recess-and-protuberance (undulating) shape, to thereby form a grating-formed orientation film.

In the grating method, it is known that the anchoring energy can be controlled by regulating the pitch and height of the grating (Y. Ohta et al., J. J. Appl. Phys., 43, 4310 (2004)).

In relation to the grating method, besides, there has been proposed a method in which the anchoring strength is enhanced by utilizing the orientation control force possessed by the orientation film material (such as polyimide) itself. Specifically, Japanese Patent Laid-open No. Hei 5-88177 proposes a method in which a photosensitive polyimide is patterned by photolithography, and Japanese Patent Laid-open No. Hei 8-114804 proposes a method in which the surface of a first orientation film is provided with a recess-and-protuberance shape which is stripe-shaped in a predetermined direction and which has a saw-toothed surface profile in the direction orthogonal to the predetermined direction, and an organic matter with molecular axes oriented in the orthogonal direction is layered on the first orientation film to form an orientation film. Further, Japanese Patent Laid-open No. Hei 3-209220 proposes a method in which a photosensitive glass is photo-etched to form the glass surface into a recess-and-protuberance shape, followed by applying an orientation film material to the thus shaped surface.

According to the grating method, it is possible to obviate the staining of the orientation film surface and the generation of static electricity which are frequently encountered in the rubbing method.

SUMMARY OF THE INVENTION

In the case of orienting the liquid crystal molecules by simply utilizing only the elastic strain effect by the grating method, however, it is necessary to set the ratio T (=H/P) between the groove pitch P and the groove height H at a sufficiently high value. More specifically, according to Y. Ohta et al., J. J. Appl. Phys. 43, 4310 (2004) mentioned above, in order to obtain an azimuth anchoring strength comparable to that of an orientation film subjected to a rubbing treatment (about $1 \times 10^{-4}$ J/m$^2$), it is necessary to set the ratio T between the groove pitch P and the height H to a value of not less than 1.

Meanwhile, the pitch of the grating presumed in practical use is not less than 1 μm. Therefore, in order to secure a sufficient azimuth anchoring strength, in the case of orienting the liquid crystal molecules by simply utilizing only the elastic strain effect, it is necessary to set the depth of the grating at a value of not less than 1 μm. Here, in the liquid crystal display panel, the cell gap is about 3 to 4 μm. Therefore, when the depth of the grating is not less than 1 μm, periodic recesses and protuberances with a depth of not less than 1 μm are formed in the panel plane, so that the retardation of the liquid crystal varies in the panel plane, and it is difficult to secure a sufficient contrast ratio. In addition, taking productivity into account, it is desirable to set the depth of the grating at a value of less than 1 μm and thereby to secure a sufficient anchoring strength.

Besides, in regard of the method of utilizing the orientation control force of the orientation film of a polyimide or the like, also, the following problems exist. For example, in the cases of the methods proposed in Japanese Patent Laid-open No. Hei 5-88177 and Japanese Patent Laid-open No. Hei 3-209220, when the orientation control force due to the recesses and protuberances of the substrate surface is compared with the orientation control force due to the orientation film, the latter is stronger; therefore, the orientation directions of the liquid crystal molecules coincide with the orientation directions of the molecular major axes in the orientation film. Since the directions of the molecular major axes in the orientation film are not controlled, it cannot be said that a sufficient orientation control force as a whole can be obtained.

Further, in the case of the method proposed in Japanese Patent Laid-open No. Hei 8-114804, the molecular axes in the orientation film are controlled by the protuberances and recesses present in the substrate surface, but the material used to form the orientation film is a photo-polymerizable liquid crystal material; therefore, there is the problem that the polyimide materials excellent in reliability and electrical properties and used in ordinary mass production cannot be used here. In addition, the orientation direction of the liquid crystal is parallel to the grooves, which results in the problem that it is necessary, for controlling the pre-tilt angle, to control the shape of the grooves to a very complicated shape. Specifically, protuberances and recesses having a saw-toothed sectional shape in a direction substantially orthogonal to the stripes of protuberances and recesses need to be formed, which makes it necessary to depend on a method of a extremely low productivity in which stamping or the like is utilized.

According to a first configuration of the present invention, there is provided a liquid crystal display including a pair of substrates joined to each other with a predetermined gap therebetween, a liquid crystal held in the gap, an orientation layer which is formed on at least one of the substrates and in which molecules of the liquid crystal are oriented, and electrodes formed on at least one of the substrates for impressing a voltage on the liquid crystal, wherein the orientation layer includes a base layer having a principal surface provided with a plurality of grooves in parallel, and a coating film covering the principal surface provided with the grooves;

the coating film has a horizontally orienting ability to orient in parallel the molecular major axes indicative of the longitudinal directions of the molecules of the liquid crystal in the condition where no voltage is impressed on the principal surface;

the grooves each extend along a predetermined direction, and are arrayed repeatedly at a given pitch along an orthogonal direction which is orthogonal to the predetermined direction;

the section of the base layer along the orthogonal direction has a recess-and-protuberance structure in which recessed parts each corresponding to the bottom of each the groove and protuberant parts each corresponding to the boundary of the adjacent grooves appear alternately and repeatedly; and the width of the protuberant part is set to be smaller than the width of the recessed part, whereby the molecular major axes of the liquid crystal are horizontally oriented in the orthogonal direction which is orthogonal to the predetermined direction of the grooves.

According to the first configuration of the present invention, there is provided further a method of manufacturing a liquid crystal display including a pair of substrates joined to each other with a predetermined gap therebetween, a liquid crystal held in the gap, an orientation layer which is formed on at least one of the substrates and in which molecules of the liquid crystal are oriented, and electrodes formed on at least one of the substrates for impressing a voltage on the liquid crystal, wherein the orientation layer includes a base layer having a principal surface provided with a plurality of grooves in parallel, and a coating film covering the principal surface provided with the grooves;

the coating film has a horizontally orienting ability to orient in parallel the molecular major axes indicative of the longitudinal directions of the molecules of the liquid crystal in the condition where no voltage is impressed on the principal surface;

the grooves each extend along a predetermined direction, and are arrayed repeatedly at a given pitch along an orthogonal direction which is orthogonal to the predetermined direction;

the section of the base layer along the orthogonal direction has a recess-and-protuberance structure in which recessed parts each corresponding to the bottom of each the groove and protuberant parts each corresponding to the boundary of the adjacent grooves appear alternately and repeatedly; and the width of the protuberant part is set to be smaller than the width of the recessed part, whereby the molecular major axes of the liquid crystal are horizontally oriented in the orthogonal direction which is orthogonal to the predetermined direction of the grooves.

According to a second configuration of the present invention, there is provided a liquid crystal display including a pair of substrates joined to each other with a predetermined gap therebetween, a liquid crystal held in the gap, an orientation layer which is formed on at least one of the substrates and in which molecules of the liquid crystal are oriented, and electrodes formed on at least one of the substrates for impressing a voltage on the liquid crystal, wherein the orientation layer includes a base layer provided with a plurality of grooves in parallel, and a coating film covering the grooves;

the grooves each extend along a predetermined direction, and are arrayed repeatedly at a given pitch along an orthogonal direction which is orthogonal to the predetermined direction;

the coating film has a horizontally orienting ability to orient the molecular major axes indicative of the longitudinal directions of the molecules of the liquid crystal in parallel to the substrates in the condition where no voltage is impressed; and the aspect ratio indicative of the ratio of the depth of the grooves to the array pitch of the grooves is in the range between a lower limit of 0.05 and an upper limit of 0.5, and the molecular major axes of the liquid crystal are horizontally oriented in the orthogonal direction with respect to the grooves.

According to the second configuration of the present invention, there is provided further a method of manufacturing a liquid crystal display including a pair of substrates joined to each other with a predetermined gap therebetween, a liquid crystal held in the gap, an orientation layer which is formed on at least one of the substrates and in which molecules of the liquid crystal are oriented, and electrodes formed on at least one of the substrates for impressing a voltage on the liquid crystal, wherein the orientation layer includes a base layer provided with a plurality of grooves in parallel, and a coating film covering the grooves;

the grooves each extend along a predetermined direction, and are arrayed repeatedly at a given pitch along an orthogonal direction which is orthogonal to the predetermined direction;

the coating film has a horizontally orienting ability to orient the molecular major axes indicative of the longitudinal directions of the molecules of the liquid crystal in parallel to the substrates in the condition where no voltage is impressed;

the aspect ratio indicative of the ratio of the depth of the grooves to the array pitch of the grooves has a lower limit and an upper limit;

the molecular major axes of the liquid crystal are horizontally oriented in random directions when the aspect ratio is below the lower limit, whereas the molecular major axes of the liquid crystal are horizontally oriented in the predetermined direction in which the grooves extend when the aspect ratio is above the upper limit;

the molecular major axes of the liquid crystal are horizontally oriented in the orthogonal direction with respect to the grooves when the aspect ratio is in the range of from the lower limit to the upper limit; and the plurality of grooves are formed in the base layer so that the aspect ratio fall within the range of from the lower limit to the upper limit.

In accordance with the first configuration of the present invention, the orientation layer for orienting the liquid crystal molecules has a two-layer structure, characteristically. Specifically, the orientation layer includes the base layer on the lower side and the coating film on the upper side. The base layer is provided with a plurality of grooves (grating) in a surface (principal surface) thereof. On the other hand, the coating film is included of an orientation film of a polymer such as a polyimide, and has a horizontally orienting ability to orient the molecular major axes of the liquid crystal in parallel to the principal surface. The combination of the base layer provided with the stripe-formed grating and the coating film having the horizontally orienting ability in this manner makes it possible to align the molecular major axes of the liquid crystal in the orthogonal direction which is orthogonal to the predetermined direction in which the grooves of the grating extend (herein, the predetermined direction may in some cases be referred to as "the rectilinear direction"). Hereinafter, this oriented state will in some cases be referred to as "the orthogonal orientation". In contrast, the pure grating system in the related art includes aligning the molecular major axes of the liquid crystal in parallel to the rectilinear direction of the grooves. Hereinafter, this oriented stated will in some cases be referred to as "the parallel orientation".

In the grating system according to the related art, the molecular major axes of the liquid crystal are to be aligned in parallel to the rectilinear direction of the grooves, so that it is necessary to set the aspect ratio of the grooves at a high value, which has been a serious obstacle from the viewpoint of display quality and productivity. In contrast, in the present invention, the grating is combined with the coating film having a horizontally orienting ability, whereby the molecular major axes of the liquid crystal are aligned not in the rectilinear direction of the grooves but in the orthogonal direction. This orthogonal orientation is obtained by the combined effect or synergistic effect of the combination of the grating of the base layer with the horizontally orienting ability of the polymer coating film, and an orientation which has not been known at all in the related art. The parallel alignment along the grooves in the related art is dependent only on the grating, and, therefore, the aspect ratio of the grooves therein needs be set at a high value. On the other hand, the orthogonal orientation according to the first configuration of the present invention is obtained by the combined effect of the grating and the polymer coating film, and, therefore, the groove aspect ratio itself may be lower as compared with that in the pure grating method according to the related art, which promises higher productivity and display quality.

Besides, in the first configuration of the present invention, the liquid crystal molecules are oriented in the orthogonal direction which is orthogonal to the direction of the grooves, which ensures that a tilt angle can be easily developed by only setting the sectional shape of the grooves to be asymmetric. In addition, in the first configuration of the present invention, not a special material but a polyimide which has long been used in practice can be used to form the orientation film, and, therefore, the orientation film can be produced by using an existing production equipment as it is.

In the first configuration of the present invention, the sectional shape of the grating is specified, especially for stabilizing the orthogonal orientation of the molecular major axes of the liquid crystal. The section in the orthogonal direction of the base layer provided with the grating has the recess-and-protuberance structure in which recessed parts each corresponding to the bottom of the groove and the protuberant parts each corresponding to the boundary of the adjacent grooves appear alternately and repeatedly. A characteristic feature of the first configuration the present invention resides in that the width of the protuberant part is set to be smaller than the width of the recessed part, whereby the molecular major axes of the liquid crystal are stably horizontally oriented in the orthogonal direction which is orthogonal to the rectilinear direction of the grooves. When the width of the protuberant part is set to be smaller than the width of the recessed part to such an extent that the flatness of the top surface of the protuberant part is lost, the horizontal orientation of the liquid crystal along the orthogonal direction of the grating can be stabilized. Ideally, the protuberant part in the section of the grating is set to lose completely the flatness of the top surface thereof to be inverted V-shaped in cross section whereas the recessed part is set to be U-shaped in cross section while retaining flatness of a bottom surface thereof, whereby the molecular major axes of the liquid crystal can be controlledly oriented in a desired direction uniformly and stably. As a result of the foregoing, the liquid crystal display according to the first configuration of the present invention can be high in productivity, can have a sufficient orientation control force and can secure a high image quality, as compared to those in the related art.

Besides, in accordance with the second configuration of the present invention, the liquid crystal is homogeneously oriented by use of the orientation film having a composite structure which includes the base layer provided with stripe-formed grooves and the coating film covering the base layer. The coating film is included of a polymer film of a polyimide resin or the like, and has a horizontally orienting ability to orient the molecular major axes of the liquid crystal in parallel to the substrates. When the coating film having the horizontally orienting ability and the base layer provided with the stripe-formed grooves are laid on each other, the orientation condition of the liquid crystal can be controlled by the synergistic effect of the coating film and the base layer.

It has been found out that the orientation control over the liquid crystal by the composite orientation layer including the base layer provided with the stripe-formed grooves (grating) and the coating film having the horizontally orienting ability depends on the so-called aspect ratio of the grating. The aspect ratio is a parameter representing the ratio of the depth of the grooves to the array pitch of the grooves, and is an index indicative of the depth (height) of the grating. The composite orientation layer in the second configuration of the present invention has a property such that the molecular major axes of the liquid crystal are horizontally oriented in random directions when the aspect ratio is below a predetermined lower limit (when the grooves of the grating are too shallow). Herein, this orientation condition will in some cases be referred to as "the random orientation". The random orientation is similar to the orientation condition obtained with a polyimide orientation film without rubbing thereof, and the grooves in this case are too shallow to develop the effect of the grating. On the other hand, when the aspect ratio is above a predetermined upper limit (when the grooves of the grating are too deep), the molecular major axes of the liquid crystal are horizontally oriented in a predetermined direction in which the grooves extend (in parallel to the grooves). Herein, this orientation condition will in some cases be referred to as "the parallel orientation". The parallel orientation is similar to the condition obtained by the grating orientation in the related art, wherein the orientation is governed exclusively by the orientation control force (anchoring force) generated by the grating, and the combined effect of the coating film and the base layer is not being exhibited.

When the aspect ratio of the grating is in the range between a lower limit and an upper limit (when the grating is in an appropriate shape, instead of being too shallow or too deep), the molecular major axes of the liquid crystal are horizontally oriented in the orthogonal direction with respect to the grooves. Herein, this orientation condition will in some cases be referred to as "the orthogonal orientation". This orthogonal orientation is a novel orientation condition just obtained by the combined effect of the grating base layer and the oriented coating film, and is superior in stability and uniformity to the parallel orientation obtained by the grating in the related art. The orientation layer according to the present invention is lower in aspect ratio and, hence, superior in productivity, as compared to the grating orientation layer according to the related art. The liquid crystal display according to the second configuration of the present invention is so configured that the base layer is provided with the grating such as to have the aspect ratio in the range between the lower limit and the upper limit, and the base layer with the grating is covered by the oriented coating film. This configuration makes it possible to realize a liquid crystal display being higher in productivity, having a more uniform and stable orientation control force, and being able to secure a higher image quality, as compared to the related art.

Besides, in the second configuration of the present invention, the liquid crystal molecules are oriented in the orthogonal direction which is orthogonal to the direction of the grooves, so that the tilt angle can be easily developed by only setting the sectional shape of the grooves to be asymmetric. Further, in the second configuration of the present invention, a horizontally orientation film of not an especial material but a polyimide or the like which has long been used in practice can be used to as the orientation film, so that the orientation film can be produced by using an existing production equipment as it is.

BRIEF DESCRIPTION OF THE DRAWINGS

FIGS. 5A and 5B schematically illustrate orientation conditions of liquid crystal molecules;

FIG. 6 is a graph showing the effects of an embodiment of the present invention;

DETAILED DESCRIPTION OF THE PREFERRED EMBODIMENTS

<First Configuration of the Present Invention>

Figure 1:
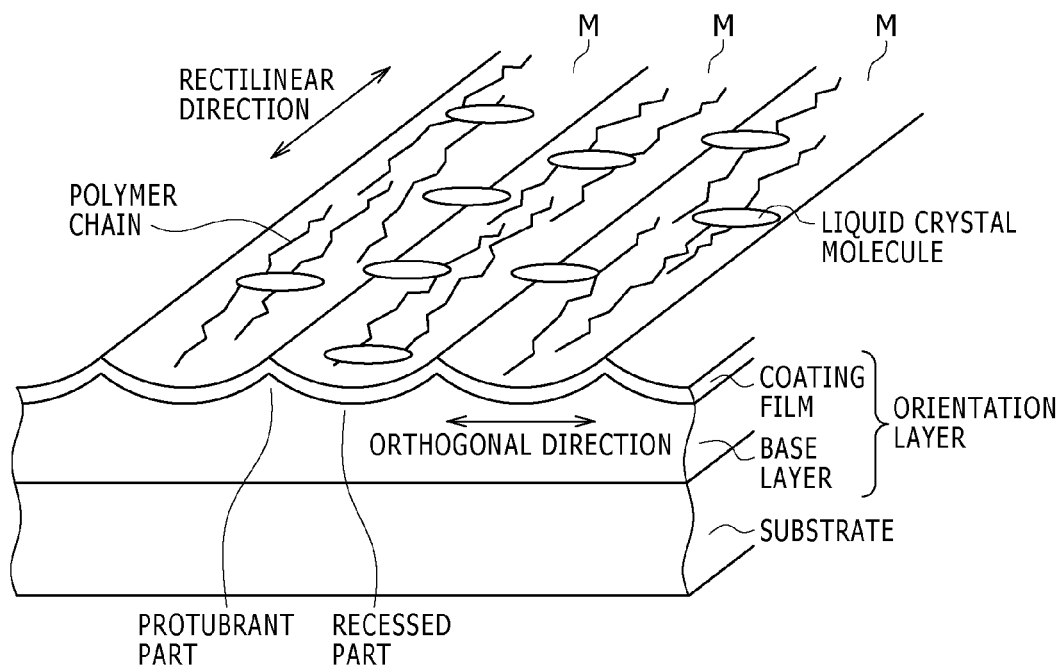
FIG. 1 is a schematic view showing an essential part of a liquid crystal display according to an embodiment of the present invention.

Now, preferred embodiments according to the first configuration of the present invention will be described in detail below, referring to the drawings.

FIG. 1 is a schematic partial perspective view showing an essential part of a liquid crystal display based on an embodiment of the present invention. The liquid crystal display based on an embodiment of the present invention basically includes a pair of substrates joined to each other with a predetermined gap therebetween, a liquid crystal held in the gap, an orientation layer formed on at least one of the substrates for orienting the molecules of the liquid crystal, and electrodes formed on at least one of the substrates for impressing a voltage on the liquid crystal. FIG. 1 shows schematically the one substrate on which the orientation layer is formed. Incidentally, the electrodes are omitted in illustration, for easy viewing of the figure.

The orientation layer includes a base layer having a principal surface provided with a plurality of grooves M in parallel, and a coating film covering the principal surface provided with the grooves M. It is to be noted here that the plurality of grooves M may not necessarily be geometrically strictly parallel to each other, and it suffices for the grooves M to be generally or substantially parallel in such a range as to produce their actions or effects intended in the present invention. The coating film includes, for example, a polymer film of a polyimide resin or the like. In the example shown in the figure, polymer chains constituting the organic polymer coating film are aligned along the grooves M. It should be noted, however, that the figure schematically shows the condition of the polymer chains, and the present invention may not necessarily be limited to such an arrangement of polymer chains. The coating film has a horizontally orienting ability by which the molecular major axes indicative of the longitudinal directions of the molecules of the liquid crystal are oriented in parallel to the principal surface under the condition where no voltage is impressed thereon. Hereinafter, the coating film having the ability to orient the liquid crystal molecules in this manner will in some cases be referred to as "the orientation film". In addition, the principal surface represents the surface (face-side surface) of the base layer provided with the plurality of grooves M, and is parallel to the substrate surface.

The grooves M each extend in a given rectilinear direction, and they are arrayed repeatedly at a given pitch along the orthogonal direction which is orthogonal to the rectilinear direction. The section of the base layer along the orthogonal direction has a recess-and-protuberance structure in which recessed parts 14B each corresponding to the bottom of each groove and protuberant parts 14A each corresponding to the boundary of the adjacent grooves appear alternately and repeatedly.

A characteristic feature of the present invention resides in that the width of the protuberant part is set to be smaller than the width of the recessed part, whereby the molecular major axes of the liquid crystal are horizontally oriented uniformly and stably in the orthogonal direction which is orthogonal to the rectilinear direction of the grooves M. Preferably, the width of the protuberant part is set to be smaller than the width of the recessed part to such an extent that the flatness of a top surface of the protuberant part is lost. Ideally, the protuberant part loses completely the flatness of the top surface thereof to be inverted V-shaped in cross section, whereas the recessed part is U-shaped in cross section while retaining flatness of a bottom surface thereof. Incidentally, the grooves M are so formed that the aspect ratio thereof indicative of the ratio of the depth of the grooves to the array pitch of the grooves is less than one. In an embodiment, the liquid crystal includes a nematic liquid crystal having positive dielectric constant anisotropy, and, when a voltage is impressed on the electrodes provided on one of the substrates, the molecular major axes of the liquid crystal in a central portion of the gap between the pair of substrates are oriented vertically to the substrate surfaces while the molecular major axes of the liquid crystal at the surface of one of the substrates remain oriented horizontally, as shown in the figure.

In the present invention, the sectional shape of the grating is specified, especially for stabilizing the orthogonal orientation of the molecular major axes of the liquid crystal. The section along the orthogonal direction of the base layer provided with the grating has the recess-and-protuberance structure in which the recessed parts each corresponding to the bottom of the groove and the protuberant parts each corresponding to the boundary of the adjacent grooves appear alternately and repeatedly. A characteristic feature of the present invention lies in that the width of the protuberant part is set to be smaller than the width of the recessed part so that the molecular major axes of the liquid crystal are horizontally oriented stably in the orthogonal direction which is orthogonal to the rectilinear direction of the grooves. With the width of the protuberant part set to be smaller than the width of the recessed part to such an extent that the flatness of the top surface of the protuberant part is lost, the horizontal orientation along the orthogonal direction with respect to the grating can be stabilized. Ideally, the protuberant part in the section of the grating is set to lose completely the flatness of the top surface thereof to be inverted V-shaped in cross section whereas the recessed part is set to be U-shaped in cross section while retaining flatness of a bottom surface thereof, whereby the molecular major axes of the liquid crystal can be controlledly oriented in a desired direction uniformly and stably. As a result of the foregoing, the liquid crystal display based on an embodiment of the present invention can be high in productivity, can have a sufficient orientation control force and can secure a high image quality, as compared to those in the related art.

Figure 2:
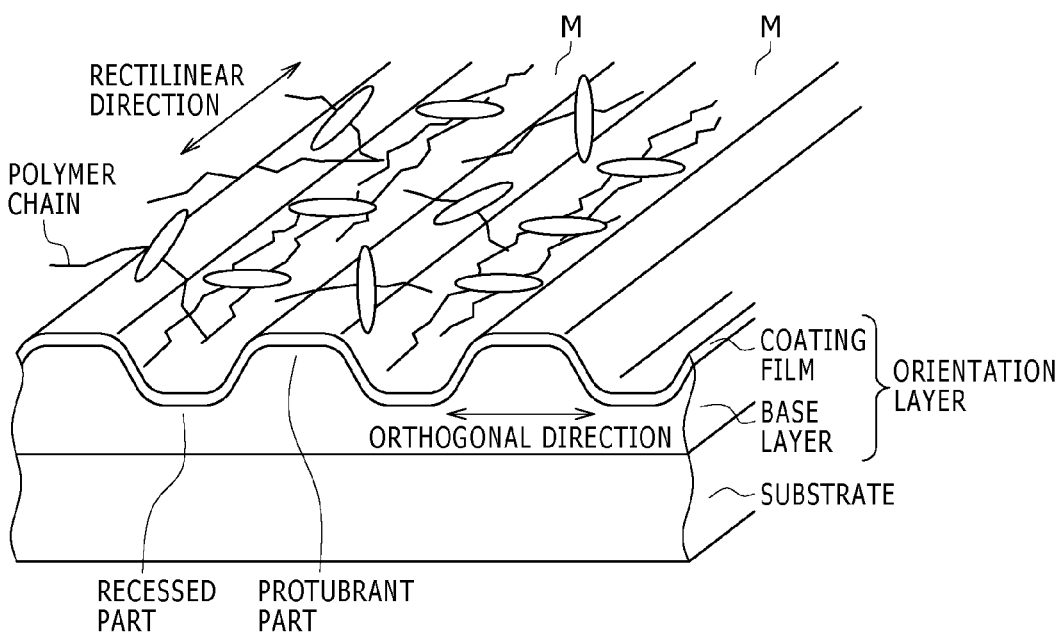
FIG. 2 is a schematic view showing a liquid crystal display according to a reference example.

FIG. 2 is a schematic view showing a reference example of liquid crystal display, in which representations corresponding to those of the liquid crystal display based on an embodiment of the present invention shown in FIG. 1 are adopted, for comparison. The difference between the two displays resides in the recess-and-protuberance structure of the grating formed in the principal surface of the base layer. In this relation, the flatness of the top surface of the protuberant part in this example is retained in a certain extent, so that the protuberant part is inverted U-shaped in section, which shape is just inverse to the sectional shape of the recessed part. In such a recess-and-protuberance structure of grating, the polymer chains are aligned along the bottom of each recessed part, whereas the polymer chains at the flat top surface of each protuberant part are not aligned. This condition is the same as the condition obtained upon application of an orientation film to the flat substrate surface in the rubbing system according to the related art. Therefore, the molecular major axes of the liquid crystal are not aligned in a fixed direction but remaining in a random horizontally oriented condition, unless the rubbing treatment is applied thereto. Accordingly, as shown in the figure, though the liquid crystal molecules in the recessed parts are aligned in the orthogonal direction with respect to the grating, the liquid crystal molecules at the protuberant parts are in a random condition, so that a homogeneous horizontal orientation in which the liquid crystal molecules are aligned along the orthogonal direction with respect to the grating cannot be obtained as a whole. As is clear from the above discussion, the present invention is characterized in that the width of each protuberant part of the grating is set to be smaller than the width of each recessed part, whereby the molecular major axes of the liquid crystal are horizontally oriented uniformly and stably in the orthogonal direction which is orthogonal to the rectilinear direction of the grooves.

Figure 3:
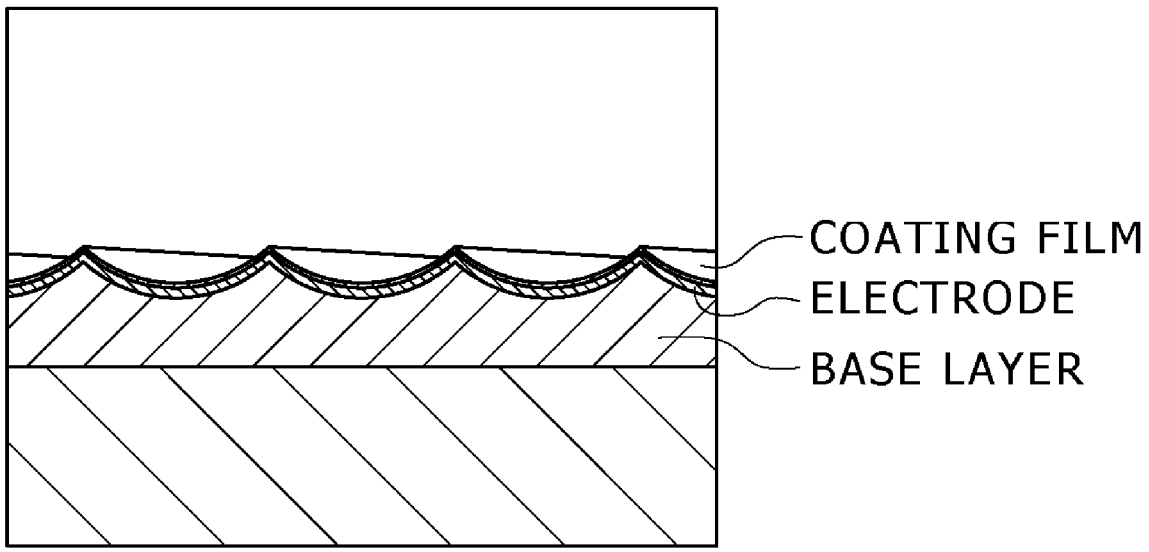
FIG. 3 is a sectional microphotograph of an essential part of the liquid crystal display according to an embodiment of the present invention.

FIG. 3 is a microphotograph showing an embodiment of the liquid crystal display based on an embodiment of the present invention. The figure shows the surface condition of the substrate shown in FIG. 1. As shown in the figure, in the actual substrate structure, electrodes are formed on the base layer, and a coating film (orientation film) is formed thereon. The base layer is composed, for example, of a photosensitive resin layer, and the surface (principal surface) thereof is provided with a grating by etching. Specifically, the base layer is irradiated with UV rays through a striped mask, then an exposure treatment is conducted, and thereafter a developing treating (etching) is conducted, to obtain the recess-and-protuberance shape shown in the figure. In this case, as the stripe width of the stripe pattern used in the mask for the exposure treatment is set narrower, the width of the protuberant part becomes narrower and the protuberant parts become steeper. More specifically, when the base layer is composed of a positive photosensitive resin layer, the portions corresponding to the shadow in the stripe pattern are left as protuberant parts, whereas the portions photosensitively affected by the UV rays between the adjacent stripes in the stripe pattern are removed to form recessed parts. With the width value of the stripe pattern reduced, it is possible to obtain a grating which has desired inverted V-shaped protuberant parts.

Figure 4:
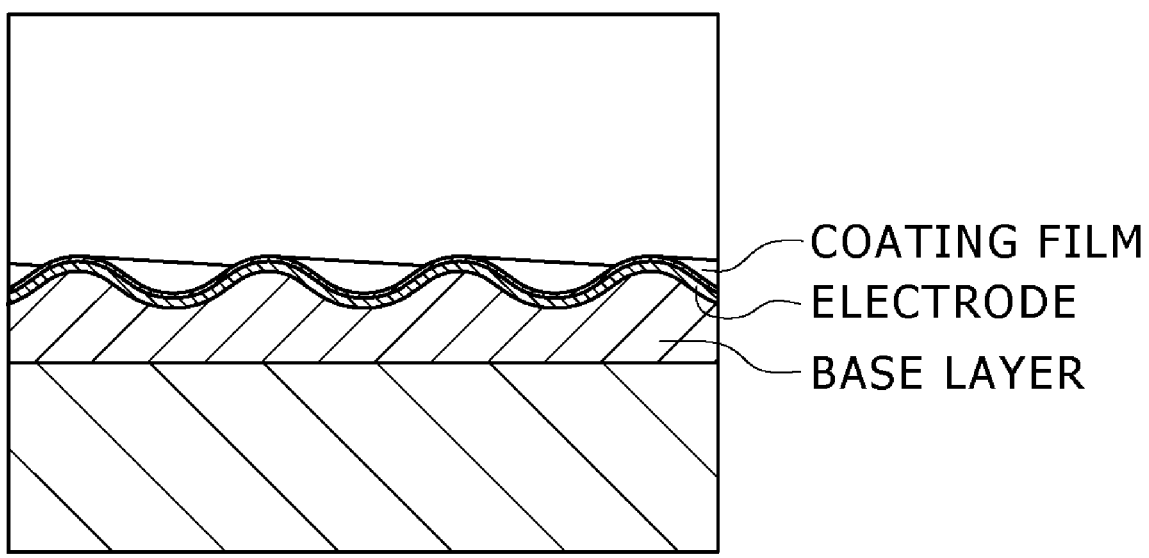
FIG. 4 is a sectional microphotograph of an essential part of the liquid crystal display according to the reference example.

FIG. 4 is a microphotographs showing the section of the substrate in the liquid crystal display according to the reference example. In the reference example, also, electrodes are formed on a base layer, and these components are covered with a coating film (orientation film). The principal surface of the base layer is provided with a grating by an exposure treatment using a stripe pattern, similarly to the above. This reference example differs from the embodiment shown in FIG. 3 in that the stripe pattern used as the mask has an enlarged stripe width, whereby the top surfaces of the protuberant parts of the grating retain flatness. In this case, a uniform and stable homogeneous orientation cannot be obtained.

FIGS. 5A and 5B schematically illustrate orientation conditions of a liquid crystal held between a pair of substrates. As shown, the molecular major axes of the liquid crystal are horizontally oriented while being aligned in a fixed direction; herein, this orientation condition will in some cases be referred to as "the homogeneous orientation". In addition, the alignment direction of the molecular major axes of the liquid crystal herein will in some cases be referred to as "the orientation direction". Therefore, the orthogonal direction intrinsic of the present invention is the homogeneous orientation in which the orientation direction coincides with the orthogonal direction with respect to the grating.

The liquid crystal display controls the orientation of the liquid crystal by use of the orientation layer, and switches the orientation condition by controlling the voltage impressed, thereby displays a desired image. A change in the orientation condition can be converted into a change in luminance (brightness) by an upper-lower pair of polarizing plates, for example. FIG. 5A shows a crossed nicol arrangement of the pair of polarizing plates, wherein the transmission axes of the upper and lower polarizing plates are orthogonal to each other. The transmission axis of the polarizing plate on the lower side, or the incidence (incoming) side, is parallel to the orientation direction of the liquid crystal. The transmission axis of the polarizing plate on the emission (outgoing) side is orthogonal to the orientation direction of the liquid crystal. When the liquid crystal is in an ideal homogeneous orientation, the incident light is perfectly interrupted by the pair of polarizing plates, so that light leakage is zero. Consequently, black display is obtained.

FIG. 5B shows a parallel nicol arrangement of the pair of polarizing plates. In the parallel nicol condition, the transmission axes of the upper and lower polarizing plates are parallel to the orientation direction of the liquid crystal. In this case, the incident light is emitted as it is, namely, without being absorbed. As a result, white display is obtained. Normally white display is obtained by adopting the parallel nicol arrangement in the condition where no voltage is impressed. On the contrary, normally black display is obtained by adopting the crossed nicol arrangement in the condition where no voltage is impressed.

FIG. 6 is a graph showing the effects of the present invention. This graph shows the results of measurement of the amount of light transmitted under the crossed nicol condition shown in FIG. 5A, for a liquid crystal display panel provided with a grating having a pitch of 3 μm. Incidentally, the pitch of the grating is fixed at 3 μm, whereas the height of the grating is varied in the range of from 0.1 to 1 μm, to form respective samples, which are served to measurement of transmittance under the crossed nicol condition. Incidentally, the grating height corresponds to the depth of grooves.

In the graph of FIG. 6, the grating height (μm) is taken on the axis of abscissas, while black luminance (nit) as an index of transmittance is taken on the axis of ordinates. Under the crossed nicol condition, the black luminance is lower as the homogeneous orientation of the liquid crystal is closer to the ideal condition. Incidentally, the graph in FIG. 6 shows the results of measurement of black luminance, for three kinds of samples fabricated by changing the width of the stripe pattern. In other words, the graph shows three characteristic curves with the stripe pattern width as a parameter. For the pitch fixed at 3 μm, the sample with a stripe pattern width of 0.3 μm corresponds to the steepest protuberant part shape. Other than this sample, a sample with a stripe pattern width of 0.8 μm and a sample with a stripe pattern width of 1.2 μm are prepared, and served also to evaluation.

Though depending on the grating height, in the case of the stripe pattern width of 0.3 μm, a black luminance of 2.5 nit is obtained under the best conditions. This shows homogeneous orientation of the liquid crystal, and a good liquid crystal orientation characteristic. In the case of the sample with a stripe pattern width of 0.8 μm, a black luminance of slightly less than 4 nit is obtained when the grating height is in the range of 0.4 to 0.7 μm. In the case of the sample with a stripe pattern width of 1.2 μm, a black luminance of slightly more than 4 nit is obtained when the grating height is in the range of 0.4 to 0.7 μm. Thus, it is seen that the orientation characteristic is lowered in proportion to an increase in the stripe pattern width.

As has been above-mentioned, the stripe pattern width of the mask corresponds substantially to the protuberant part width of the grating. Therefore, where the grating pitch is 3 μm and the stripe pattern width is 0.3 μm, the protuberant part width is about 0.3 μm and the recessed part width is the remaining 2.7 μm. With the width of the protuberant part of the grating thus set to be smaller than the width of the recessed part, the liquid crystal molecules can substantially be put into homogeneous orientation along the orthogonal direction with respect to the grating, though depending on the grating height. Similarly, where the stripe pattern width is 0.8 µm, the protuberant part width is about 0.8 µm and the recessed part width is 2.2 µm. In this sample, also, the protuberant part width is smaller than the recessed part width, and the desired homogeneous orientation can be obtained. Further, even in the sample with a stripe pattern width of 1.2 µm, the protuberant part width is 1.2 µm and the recessed part width is 1.8 µm, so that the protuberant part width is smaller than the recessed part width and, therefore, the desired homogeneous orientation can be obtained.

On the other hand, as for the grating height, it is seen that if the grating height is enlarged beyond a suitable value, the homogeneous orientation is disturbed and the black luminance is raised abruptly. For example, when attention is paid to a sample with a stripe pattern width of 0.3 µm, it is seen that when the grating height exceeds 0.7 µm, the transmittance is raised abruptly, which means that the homogeneous orientation along the orthogonal direction with respect to the grating cannot be obtained. Thus, when the ratio of the height of the grating to the pitch of the grating (aspect ratio) becomes higher, the effect intrinsic of the grating is exhibited more strongly, and the liquid crystal molecules shows a higher tendency to be oriented in the rectilinear direction with respect to the grating. When the aspect ratio exceeds a certain value, the liquid crystal molecules are oriented in parallel to the grating, so that the liquid crystal display would show a twisted orientation condition instead of the homogeneous orientation. Therefore, the orientation condition would be changed, to increase the leakage of light, resulting in a lowered black luminance. In other words, in order to obtain the homogeneous orientation along the orthogonal direction with respect to the grating, the aspect ratio of the grating has to be lowered to a certain extent, and this point constitutes a difference from the simple grating system according to the related art. Similarly, also in the cases of the samples having stripe pattern width values of 0.8 µm and 1.2 µm, if the grating height exceeds 0.8 µm and the aspect ratio is raised, the orientation direction of the liquid crystal molecules is deviated from the orthogonal direction with respect to the grating into the rectilinear direction with respect to the grating, making it impossible to obtain a low black luminance.

Figure 7:
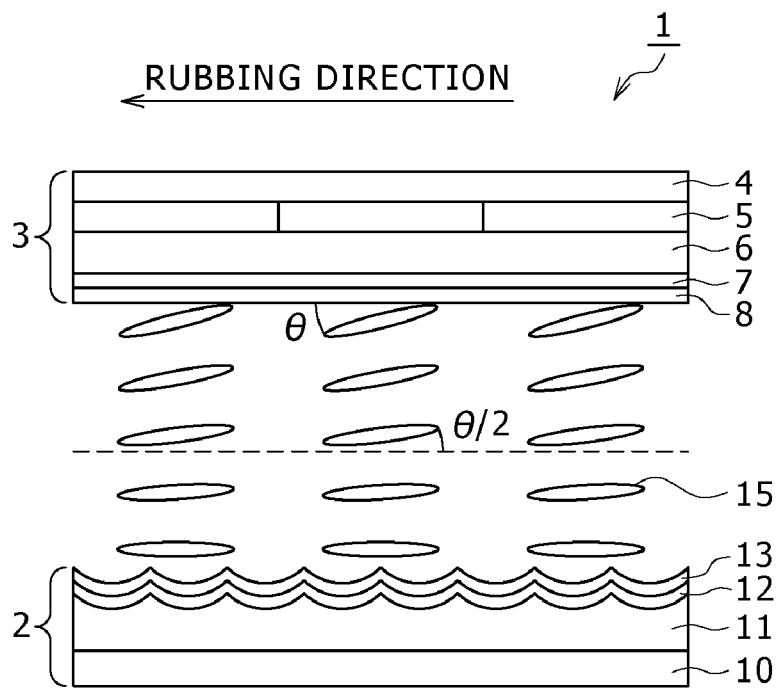
FIG. 7 is a schematic sectional view showing a first embodiment of the liquid crystal display according to the present invention.

FIG. 7 is a partly enlarged sectional view of a liquid crystal panel 1 to be applied to the liquid crystal according to the Embodiment 1 of the present invention. The liquid crystal display in this embodiment is a so-called transmission type or reflection type display, wherein a polarizing plate and the like are provided at least on the face side, i.e., on the upper side of the liquid crystal panel 1 in FIG. 7. In addition, in the transmission type, a backlight device is provided on the back side, i.e., on the lower side of the liquid crystal panel 1 in FIG. 7. In the reflection type, a front light device is provided on the face side, i.e., on the upper side of the liquid crystal panel 1 in FIG. 7.

The liquid crystal panel 1 has a liquid crystal sandwiched between a TFT array substrate 2 and a CF substrate 3. Here, the CF substrate 3 is fabricated by a method in which a color filter 5, an insulating film 6, an electrode 7 composed of a transparent electrode, and an orientation film 8 are sequentially formed over a glass substrate 4 which is a transparent insulating substrate. Here, the electrode 7 is formed ordinarily by forming a film of ITO (Indium Tin Oxide) over the whole surface area, but it may be patterned on the basis of each pixel or on the basis of each sub-pixel. The orientation film 8 is formed by a method in which a mixture of a soluble polyimide and polyamic acid as a liquid crystal orienting material for inducing the horizontal orientation is applied by a printing process, and is baked at a temperature of 200° C. for 75 min, to form a polyimide thin film having a thickness of 50 nm, followed by a rubbing treatment to impart an orienting ability to the polyimide thin film. Incidentally, the rubbing direction in the rubbing treatment is the direction of arrow in the figure, which is orthogonal to the extension direction (rectilinear direction) of the grooves M to be described later.

Figure 8:
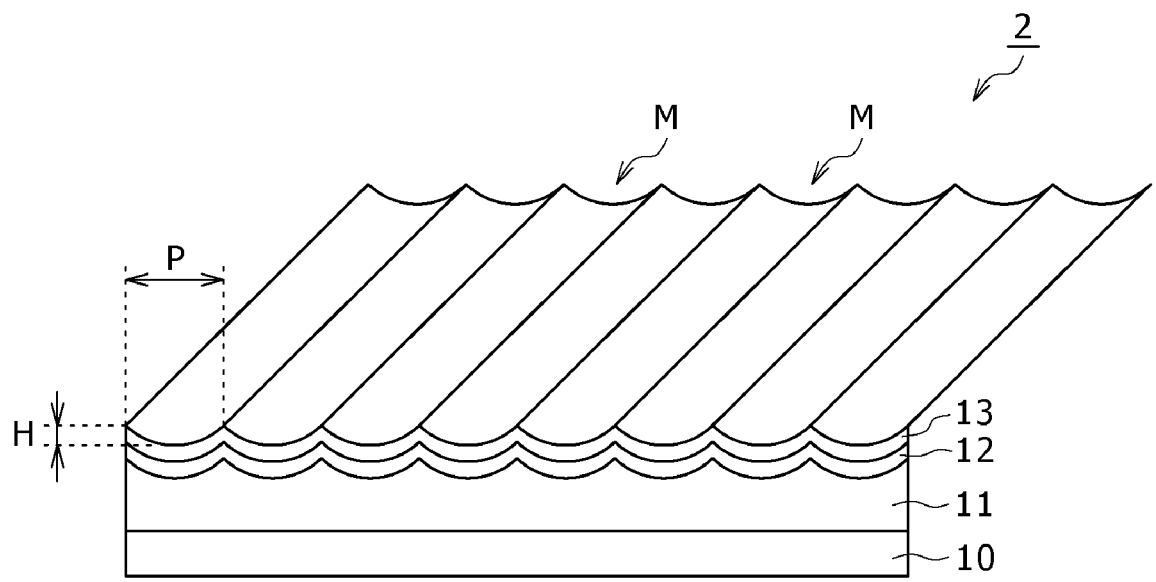
FIG. 8 is a schematic perspective view of an essential part of the first embodiment.

On the other hand, the TFT array substrate 2 is fabricated by a method in which, as shown in FIG. 8, TFTs or the like are formed on a glass substrate 10 which is a transparent insulating substrate, then an insulating film 11 is formed thereon, and an electrode 12 and an orientation film 13 are sequentially formed over the insulating film 11. As is clear from the above description, the insulating film 11, the electrode 12 and the orientation film 13 sequentially formed over the substrate 10 constitute the orientation layer in an embodiment of the present invention. Of these components, the insulating film 11 and the electrode 12 correspond to the base layer shown in FIG. 1, and the orientation film 13 corresponds to the coating film shown in FIG. 1.

The TFT array substrate 2 is so fabricated that the shape of its principal surface for forming the orientation film 13 thereon has a grooved shape in which grooves extending rectilinearly in a predetermined direction are arrayed repeatedly in the direction orthogonal to the predetermined direction, and the grooved shape is coated with a polymer film to form the orientation film 13. Besides, in this embodiment, the surface shape of the insulating film 11 is made to coincide with the grooved shape, and the surface for forming the orientation film 13 thereon is formed in the grooved shape. Here, the grooves M each extend along a given rectilinear direction, and are arrayed repeatedly at a given pitch P along the orthogonal direction which is orthogonal to the rectilinear direction. The section of the insulating film 11 along the orthogonal direction has a recess-and-protuberance structure in which recessed parts each corresponding to the bottom of each groove M and protuberant parts each corresponding to the boundary of the adjacent grooves M appear alternately and repeatedly. A characteristic feature resides in that the width of the protuberant part is set to be smaller than the width of the recessed part, whereby the major axes of liquid crystal molecules 15 are horizontally oriented in the orthogonal direction which is orthogonal to the rectilinear direction of the grooves M. Specifically, the protuberant part is set to lose completely the flatness of the top surface thereof to be inverted V-shaped in cross section, whereas the recessed part is set to be U-shaped in cross section while retaining flatness of a bottom surface thereof, whereby the liquid crystal molecules 15 are uniformly and evenly set in homogeneous orientation.

Here, the cross sectional shape of the groove M is a roughly circular arc shape which is symmetrical, with the peak of the groove M as the center of symmetry. In addition, the grooves M are formed to have a pitch P of 1 µm and a height (depth) H of 400 nm, so that the ratio T (=H/P) between the pitch P and the height H is 0.4, which is less than one.

More specifically, in the TFT array substrate 2, the insulating film 11 is formed by use of a novolak or acrylic or other organic resist material or by use of $SiO_2$, SiN or an inorganic material containing $SiO_2$ or SiN as a main constituent.

Here, in the case of forming the insulating film 11 by use of a photosensitive organic resist material, the TFT array substrate 2 is coated with the photosensitive organic resist material, followed by pre-baking, and then the resist material is exposed to UV rays or the like by use of a mask having a pattern (stripe pattern) corresponding to the grooves M. Besides, development and post-baking are conducted, to thereby apply a photolithographic process, whereby the surface of the insulating film 11 is processed to have a grooved shape. Incidentally, the exposure treatment may be conducted by utilizing interference of luminous fluxes radiated from two different directions, in place of the use of a mask. Further, the photolithographic process may be replaced by other technique, such as a nano-imprinting process.

In addition, in the case of forming the insulating film 11 by use of an inorganic material, the inorganic material is deposited in a predetermined film thickness on the TFT array substrate 2 by vacuum evaporation, sputtering, CVD or the like, then a photosensitive organic resist material is patterned into a grooved shape by a photolithographic process, and thereafter wet etching or dry etching is conducted, whereby the surface on the side of the orientation film 13 is processed into a grooved shape. Besides, the insulating film 11 can also be formed by use of a commercially available photosensitive material based on a mixture of an inorganic material and an organic material. In this case, patterning by a photolithographic process is conducted, followed by baking and the like steps, whereby the organic component is dissipated into the atmosphere, leaving the insulating film 11 composed mainly of the inorganic component.

In the case of the transmission type, the electrode 12 is formed ordinarily by forming a film of a transparent electrode material such as ITO over the whole surface, followed by patterning. Incidentally, in the case of the reflection type, a metallic material such as aluminum, silver, etc. may be applied.

The orientation film 13 is formed by a method in which a polyimide material which is generally used is applied by an offset printing process, followed by baking at a temperature of 200° C. for 75 min. When the orientation film 13 undergoes the baking treatment, the polymer chains in the orientation film are aligned in a predetermined direction relative to the grooves M, whereby an orienting ability is imparted to the orientation film 13. Incidentally, the method of applying the material for forming the orientation film 13 may be selected from among various techniques such as a spin coating method, a dipping method of dipping in a solution prepared through dilution with a solvent such as gamma-butyrolactone, acetone, etc., a spraying method, etc.

Here, in forming the orientation film 13, specifically, in the process of application and baking of the orienting material under the condition where the underlying layer is provided with the grooved surface shape, the polymer chains in the orientation film are aligned in a predetermined direction relative to the grooves, whereby an orienting ability is imparted to the orientation film 13. One of the reasons for this phenomenon is considered to lie in the fact that in the process of the temperature rise and fall during the baking, the substrate 10 expands and contracts, and the stresses due to the expansion and contraction produce a uniaxial orientation effect by acting in specified directions of the orientation film 13 depending on the grooved shape, whereby the polymer chains in the orientation film are aligned in a predetermined direction.

As a result of various investigations, it is found out that in order for the liquid crystal molecular axes to be aligned in a fixed direction by the baking after the application of material, grooves M extending in the direction orthogonal to the fixed direction needs to be preliminarily formed in the surface on the lower side of the orientation film 13, and the mere presence of simple projections or ruggedness results in that the molecular axes in the orientation film are aligned in directions from each crest toward the plain and that the orientation film 13 cannot be provided with the orienting ability in a specified direction.

As for the grooves M, even in the case where the ratio T (=H/P) between the pitch P and the height H is less than one, the orienting ability can be sufficiently imparted to the orientation film 13. From the viewpoint of processing the surface on the lower side of the orientation film 13 into the grooved shape, productivity can be enhanced by setting the ratio T between the pitch P and the height H to a value of less than one, preferably by setting the ratio T between the pitch P and the height H to a value of less than 0.5.

The liquid crystal display panel 1 is fabricated by adhering the TFT array substrate 2 and the CF substrate 3 to each other through a sealing material, and pouring a nematic liquid crystal having a positive dielectric constant anisotropy into the gap between the TFT array substrate 2 and the CF substrate 3. Incidentally, in FIG. 7, the liquid crystal molecules are denoted by symbol 15, and symbols θ and θ/2 denote tilt angles of the liquid crystal molecules 15. In this case, when the liquid crystal is poured into the gap and the orientation directions of the liquid crystal molecules 15 are checked, it is confirmed that the liquid crystal molecules 15 are oriented in the direction orthogonal to the extension direction of the grooves M near the surface on the side of the TFT array substrate 2, and that when the TFT array substrate 2 and the CF substrate 3 are adhered to each other so that the extension direction of the grooves M is orthogonal to the rubbing direction, as shown in FIG. 7, the liquid crystal molecules 15 are in homogeneous orientation. Incidentally, it is also confirmed that when the TFT array substrate 2 and the CF substrate 3 are adhered to each other so that the extension direction of the grooves M is parallel to the rubbing direction, the liquid crystal molecules 15 are in twisted nematic orientation.

Figure 9:
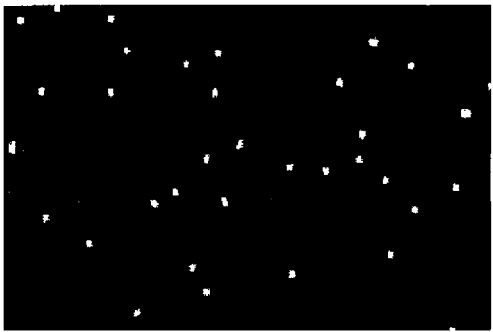
FIG. 9 shows a polarizing light microphotograph of the first embodiment.

FIG. 9 shows a polarizing light microphotograph of one-pixel portion of the liquid crystal display panel 1, showing the results of observation of the condition where a pair of polarizing plates are set in the above-mentioned crossed nicol arrangement and the liquid crystal display panel 1 with the homogeneous orientation is disposed between the polarizing plates. As is clear from the figure, the liquid crystal display panel 1 based on an embodiment of the present invention is in a substantially perfect black display state under the crossed nicol condition. Incidentally, the white dots in the microphotograph reflect spacers for keeping constant the dimension of the gap between the pair of substrates.

Figure 10:
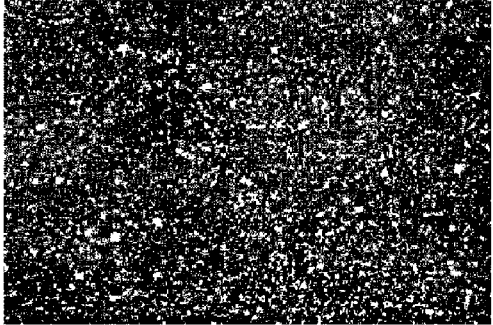
FIG. 10 shows a polarizing light microphotograph of the liquid crystal display according to the reference example.

FIG. 10 shows a polarizing light microphotograph of a liquid crystal display panel obtained by adopting the orienting method of the simple grating system according to the related art. In other words, the liquid crystal display panel of the grating system in related art is obtained by orienting the liquid crystal molecules by simply utilizing only the elastic strain effect of the grating, while omitting the orientation film 13 on the side of the TFT array substrate 2. The microphotograph in FIG. 10 shows the results of observation of the liquid crystal display panel under the same crossed nicol condition as above.

In this case, when the optical axis of the liquid crystal display panel 1 is perfectly aligned, no phase change is generated in the light being incident from the polarizer, so that black display is obtained upon observation. However, when the optical axis is deviated locally, a grey or white pattern is observed. Referring to the observation results shown in FIGS. 9 and 10, the sample corresponding to FIG. 9 is observed to be more deeply black. From this it can be determined that the liquid crystal display panel according to an embodiment of the present invention is higher in liquid crystal orientation characteristic than the liquid crystal display panel obtained by the grating method according to the related art in which the liquid crystal molecules are put into homogeneous orientation by simply utilizing only the elastic strain effect.

In addition, in the liquid crystal display panel 1 according to this embodiment, the ratio T between the groove pitch P and the groove height H is 0.2, which is less than one, and it is possible to secure a higher productivity by remarkably simplifying the step of forming the grooves M, as compared to the grating method in related art in which the liquid crystal molecules are oriented by simply utilizing only the elastic strain effect and in which the ratio T is not less than one. Besides, the liquid crystal display panel 1 of this embodiment can be manufactured while using various excellent-characteristic materials and, further, can realize the orienting ability easily and securely. Consequently, this embodiment makes it possible, in carrying out the grating method, to effectively obviate the various problems encountered in the configurations in related art based on the utilization of the orientation control force possessed by the orientation film itself.

Besides, from the observation results shown in FIGS. 9 and 10, it has been confirmed that while the liquid crystal molecules are oriented in the direction orthogonal to the extension direction of the grooves M on the side of the TFT array substrate 2 in the liquid crystal display panel 1 according to this embodiment, the liquid crystal molecules are oriented in the direction parallel to the extension direction of the grooves M on the side of the TFT array substrate 2 in the liquid crystal display panel obtained by the grating method according to the related art. This means that the orientation of the liquid crystal molecules 15 under the function of the orientation film 13 in this embodiment is different from the orientation by the grating method in related art based on the utilization of the elastic strain effect.

In addition, the tilt angle of the liquid crystal cell in the state of homogeneous orientation is measured by the crystal rotation method, to be about 1.5 degrees. Here, the tilt angle of a liquid crystal cell in the case where both the TFT array substrate 2 and the CF substrate 3 are subjected to the rubbing treatment is about three degrees. Therefore, it is considered that, in the liquid crystal display panel 1 according to this embodiment, the tilt angle θ at the surface of the CF substrate 3 is three degrees, and the tilt angle at the surface of the TFT array substrate 2 is zero degree.

Figure 11:
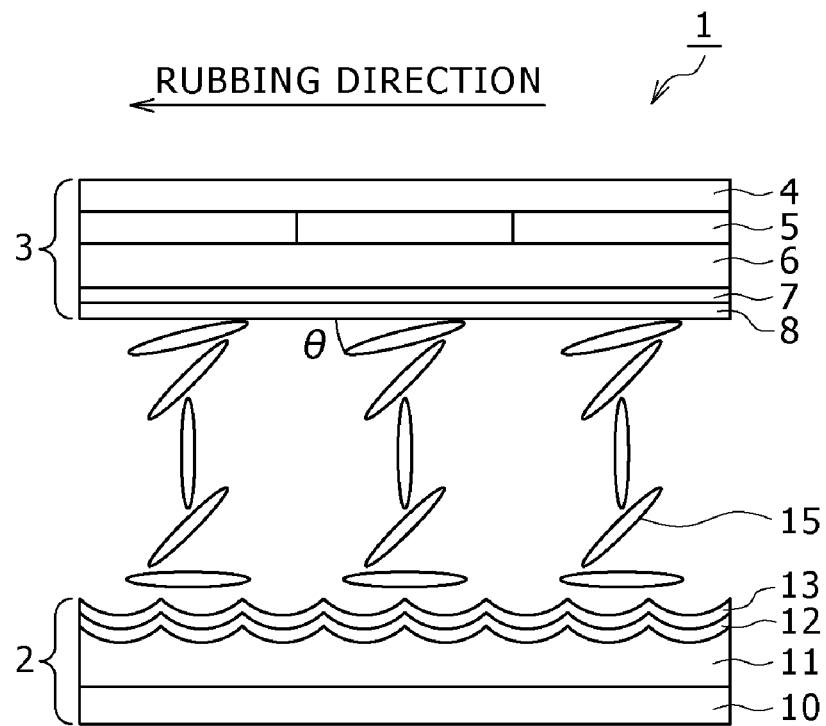
FIG. 11 is a schematic sectional view for use in describing an operation of the liquid crystal display according to the first embodiment.

FIG. 11 illustrates schematically the case where a voltage is impressed on this liquid crystal display panel 1. Even upon application of a voltage to the liquid crystal display panel 1, the orientation of the liquid crystal molecules is not changed in the vicinity of the interfaces of the TFT array substrate 2 and the CF substrate 3, the tilt angle of the liquid crystal molecules 15 is gradually increased as one goes away from the interfaces, and the tilt angle reaches a maximum of about 90 degrees at a central portion of the gap between the TFT array substrate 2 and the CF substrate 3.

The retardation upon application of the voltage is measured by the rotating analyzer method, and is compared with the retardation of a liquid crystal cell obtained by subjecting both the TFT array substrate 2 and the CF substrate 3 to the rubbing treatment. Here, in the case where the anchoring strength is low, the tilt angle of the liquid crystal molecules at the interface on the side of the TFT array substrate 2 is changed by the impressing of the voltage. Therefore, the retardation measured here would be smaller than the retardation of the liquid crystal cell obtained by subjecting both the TFT array substrate 2 and the CF substrate 3 to the rubbing treatment. However, upon impressing the voltage, the liquid crystal display panel 1 of this embodiment showed a retardation comparable to the retardation of the liquid crystal cell obtained by subjecting both the TFT array substrate 2 and the CF substrate 3 to the rubbing treatment. From this, it is confirmed that a sufficient anchoring strength is secured by the function of the orientation film 13 present on the side of the TFT array substrate 2.

Incidentally, while the case where the orientation film 13 on the TFT array substrate 2 and the orientation film 8 on the CF substrate 3 are provided with the orienting ability respectively by the grooved shape and the rubbing treatment has been described in the Embodiment 1 shown in FIG. 7 above, the present invention is not limited to this configuration. On the contrary, the orientation film 13 on the TFT array substrate 2 and the orientation film 8 on the CF substrate 3 may be provided with the orienting ability by the rubbing treatment and the grooved shape, respectively. Further, both the orientation films 8 and 13 on the TFT array substrate 2 and the CF substrate 3 may be provided with the orienting ability by the grooved shape. In addition, while the case of applying a nematic liquid crystal has been described in the embodiment of FIG. 7 above, the present invention is widely applicable to various liquid crystals such as smectic and cholesteric liquid crystals or the like.

Figure 12:
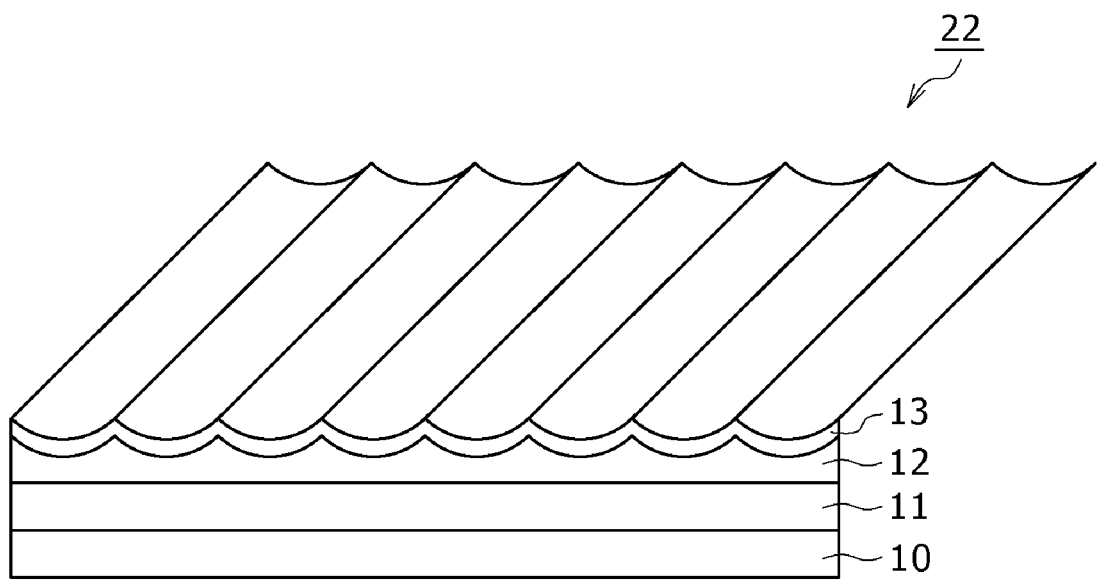
FIG. 12 is an essential part perspective view showing a second embodiment of the liquid crystal display according to the present invention.

FIG. 12 is a perspective view showing a TFT array substrate of a liquid crystal display panel applied to the Embodiment 2 of the present invention, in contrast to FIG. 8. This TFT array substrate 22 has a structure in which, in place of the surface shape of the insulating film 11, the surface shape of the electrode 12 is formed in a grooved shape, so that the surface for forming the orientation film 13 thereon is formed in the grooved shape. The liquid crystal display panel in this embodiment is the same as the liquid crystal display panel in the Embodiment 2, except for the point relating to the processing for forming this grooved shape.

Specifically, in fabricating the TFT array substrate 22 in this embodiment, an insulating film 11 is formed in a predetermined thickness on a glass substrate 10 in the same manner as in the Embodiment 1 above. Subsequently, a film of ITO, aluminum, silver or the like is formed, a photoresist is patterned into a shape of grooves by a photolithographic process, and the electrode 12 is formed into a grooved shape by a wet etching treatment or a dry etching treatment. Incidentally, the configuration shown in FIG. 12 may be applied to the CF substrate, in the same manner as mentioned in the Embodiment 1 above.

When the surface for forming the orientation film thereon is formed into a grooved shape by forming the surface shape of the electrode 12 into the grooved shape in place of the surface shape of the insulating film, as in this embodiment, also, the same effects as in the Embodiment 1 can be obtained.

Figure 13:
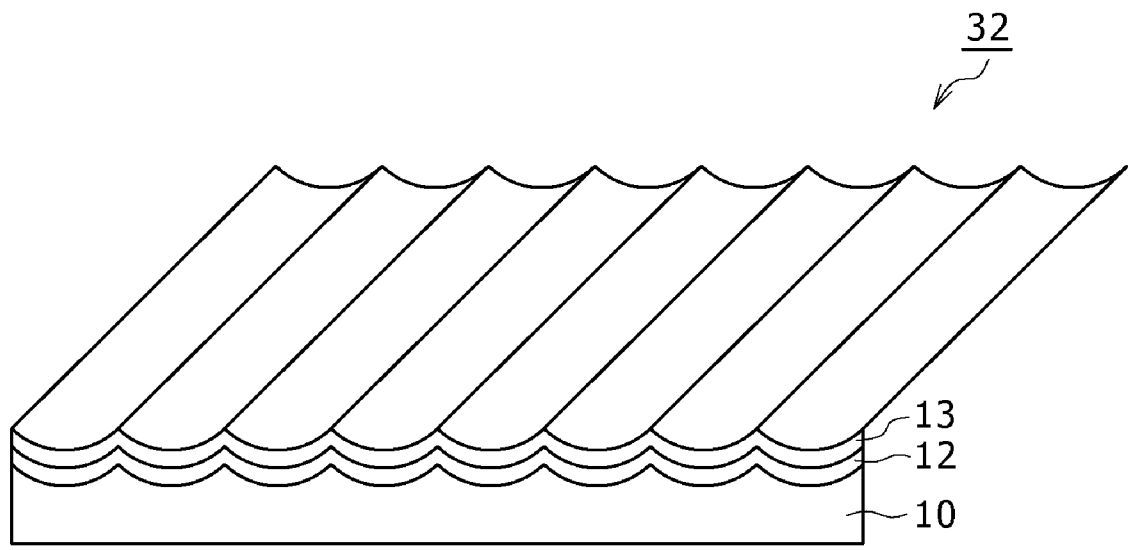
FIG. 13 is an essential part perspective view showing a third embodiment of the liquid crystal display according to the present invention.

FIG. 13 is a perspective view showing a TFT array substrate of a liquid crystal display panel applied to a liquid crystal display according to Embodiment 3 of the present invention, in contrast to FIG. 8. This TFT array substrate 32 has a structure in which, in place of the surface shape of the insulating film 11, the surface shape of a glass substrate 10 serving as an insulating substrate is directly formed into a grooved shape, whereby the surface for forming an orientation film 13 thereon is formed into the grooved shape. The liquid crystal display panel in this embodiment is the same as the liquid crystal display panel 1 in Embodiment 1 above, except for the point relating to the processing for forming the grooved shape. Incidentally, while the insulating film is omitted in the embodiment shown in FIG. 13, the insulating film may be provided, as required.

Specifically, in fabricating the TFT array substrate 32, a photoresist is patterned into a grooved shape by a photolithographic process on the face side of a glass substrate 10, and then a wet etching treatment or a dry etching treatment is conducted, to process the face-side surface of the glass substrate 10 into a grooved shape. Thereafter, an electrode 12 and an orientation film 13 are sequentially formed. Incidentally, the configuration shown in FIG. 13 may be applied to the CF substrate, in the same manner as in Embodiment 1 above. While the orientation film is formed over the base layer with the electrode therebetween in Embodiments 1 to 3, the present invention is not limited to this configuration; in some cases, the orientation film may be formed directly on the base layer.

When the surface for forming the orientation film thereon is formed into a grooved shape by forming the surface shape of the insulating substrate into the grooved shape in place of the surface shape of the insulating film, as in this embodiment, also, the same effects as in Embodiment above can be obtained.

Figure 14:
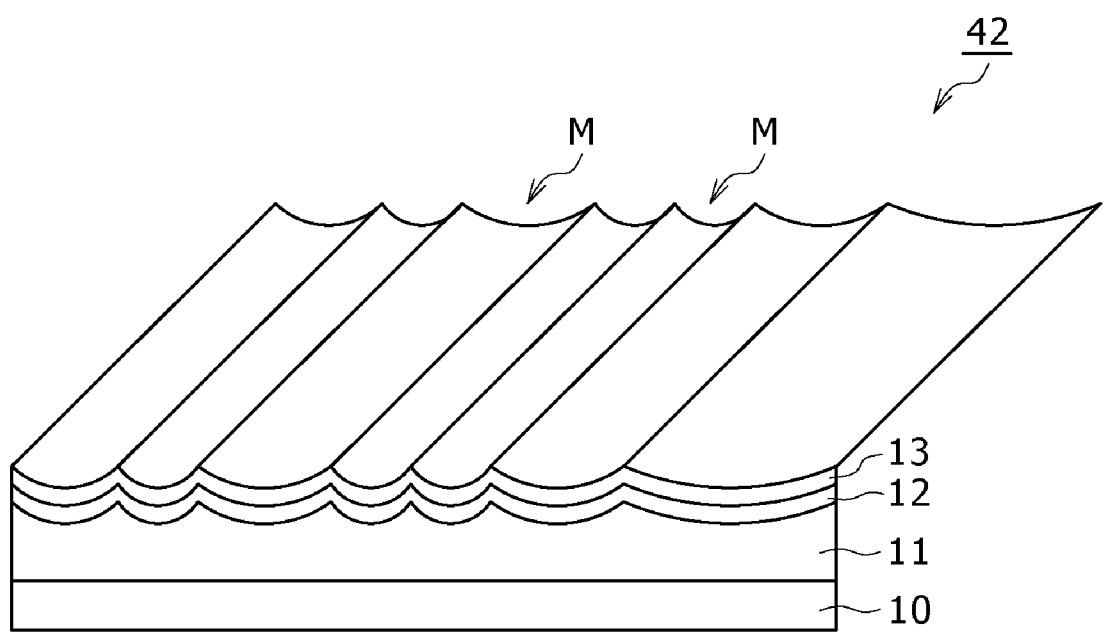
FIG. 14 is an essential part perspective view showing a fourth embodiment of the liquid crystal display according to the present invention.

FIG. 14 is a perspective view showing a TFT array substrate 42 applied to a liquid crystal display according to Embodiment 4 of the present invention, in contrast to FIG. 8. In fabricating this TFT array substrate 42, grooves M are so formed that more than a predetermined number of grooves M are not formed in succession at a fixed pitch P. More specifically, in the TFT array substrate 42, the groove pitch P is varied at random in a succession of the grooves M. This ensures that the successive grooves M in the TFT array substrate 42 do not function as a diffraction grating. The liquid crystal display panel in this embodiment is configured in the same manner as in the above-described embodiments, except for the difference in the setting of the groove pitch P in the TFT array substrate 42.

To be more specific, in the case where the grooves M are formed at a fixed pitch P, the periodic grooves M function as a diffraction grating, so that a rainbow-colored interference fringe is seen, resulting in marked degradation of image quality. In the case of a transmission type liquid crystal display panel, the orientation film is in contact with the liquid crystal which has a refractive index of about 1.5. Since the refractive index of the transparent electrode such as ITO is about two, therefore, a rainbow-colored interference fringe is generated, though not so severely as in the case where the grooves M are exposed to the air. Besides, the rainbow-colored interference fringe is more conspicuous in the case of a reflection type liquid crystal display panel.

On the other hand, when the groove pitch P is varied at random as in this embodiment so that more than a predetermined number of grooves M are not present in succession at a fixed pitch P, it is possible to prevent the generation of such a rainbow-colored interference fringe and to prevent the image quality from being degraded.

Figure 15:
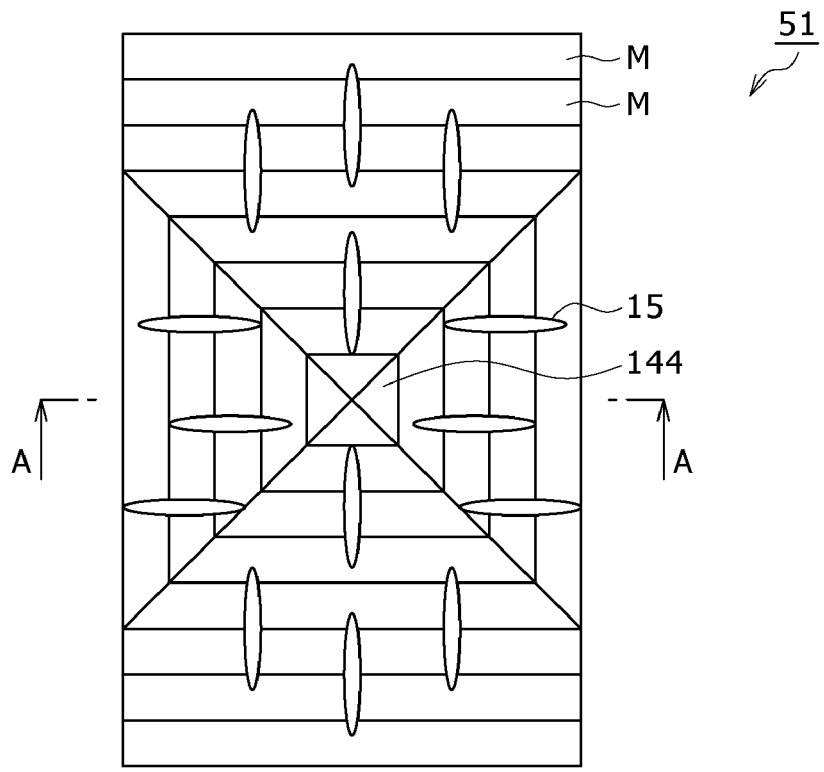
FIG. 15 is a plan view showing a fifth embodiment of the liquid crystal display according to the present invention.
Figure 16:
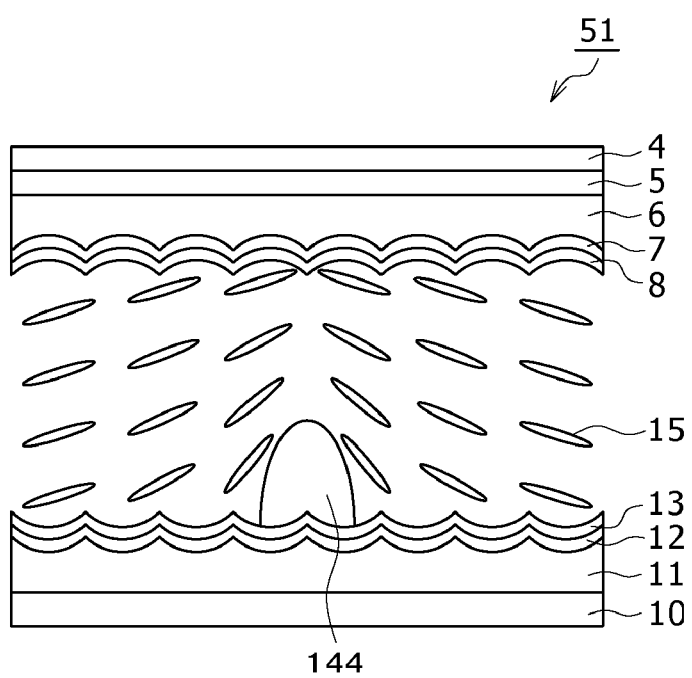
FIG. 16 is a sectional view showing the fifth embodiment.
Figure 17:
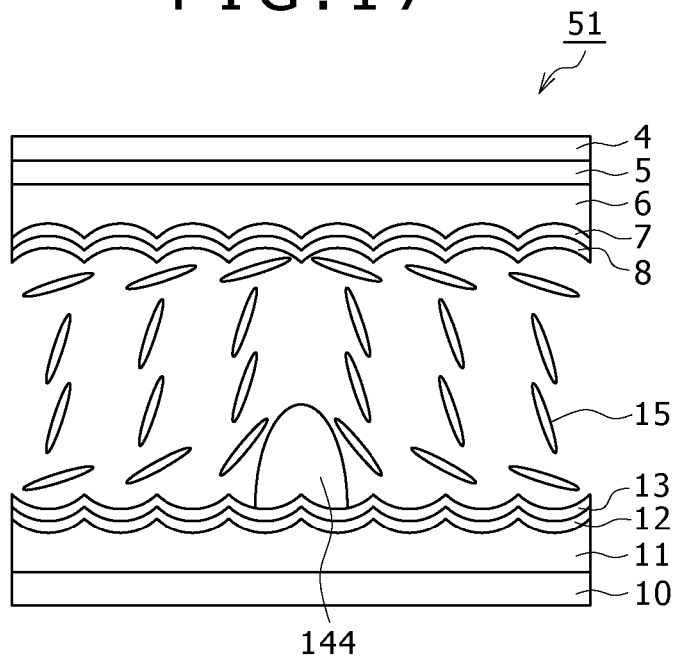
FIG. 17 is a sectional view showing the fifth embodiment.

FIG. 15 is a plan view showing a liquid crystal display panel applied to a liquid crystal display according to Embodiment 5 of the present invention, and FIG. 16 is a detailed sectional view of the liquid crystal display panel 51 taken along line A-A of FIG. 15. In addition, FIG. 17 is a sectional view showing the condition where a voltage is impressed on electrodes, in contrast to FIG. 16. In the liquid crystal display panel 51 in this embodiment, the same components as those in the above-described embodiments are denoted by the same symbols as used above, and descriptions of them are omitted appropriately.

In the liquid crystal display panel 51, an orientation film 8 on a CF substrate and an orientation film 13 on a TFT array substrate are both provided with an orienting ability by way of a grooved shape. Incidentally, the grooved shape may be formed by applying any of the methods in Embodiments 1 to 3.

The liquid crystal display panel 51 has a configuration in which, in the CF substrate and the TFT array substrate, on the upper and lower sides (in the figure) of the center of each pixel, the grooves M are formed to extend horizontally in the figure, whereas on the left and right sides (in the figure) of the center of each pixel, the grooves M are formed to extend vertically in the figure. Consequently, the grooves M are formed in the shape of tetragons, with the center of the pixel as the center of each of the tetragons. Accordingly, the liquid crystal display panel 51 has the grooves M formed in a pattern which is symmetrical, on the vertical and horizontal directions in the figure, with respect to the center of the pixel. In addition, the liquid crystal molecules 15 are oriented so as to point the center of the pixel. Specifically, the liquid crystal molecules 15 on the upper and lower sides (in the figure) of the center of each pixel are oriented in the vertical direction in the figure, and the liquid crystal molecules 15 on the left and right sides (in the figure) of the center of each pixel are oriented in the horizontal direction in the figure.

Besides, in the TFT array substrate of the liquid crystal display panel 51, a tetragonal pyramidal projection is formed to protrude toward the CF substrate, at the center of one pixel. This makes the liquid crystal display panel 51 have a structure in which the tilt angle is gradually reduced as one goes from the center of one pixel toward the peripheries of the pixel. Consequently, in the liquid crystal display panel 51, the phase of light incident on the liquid crystal cell from the same polar angle will be substantially equal, even for different azimuth values, so that the liquid crystal display panel 51 has an enlarged angle of visibility.

According to this embodiment, by varying the extension direction of the grooves in each pixel, a desired angle of visibility can be secured.

Specifically, by forming the grooves M in a pattern which is symmetrical, on the vertical and horizontal direction in the figure, with respect to the center of each pixel, the angle of visibility can be enlarged. Incidentally, a configuration may be adopted in which each pixel is divided into a plurality of sub-pixels, and the grooves are formed in a pattern which is symmetrical with respect to the center of each sub-pixel.

Figure 18:
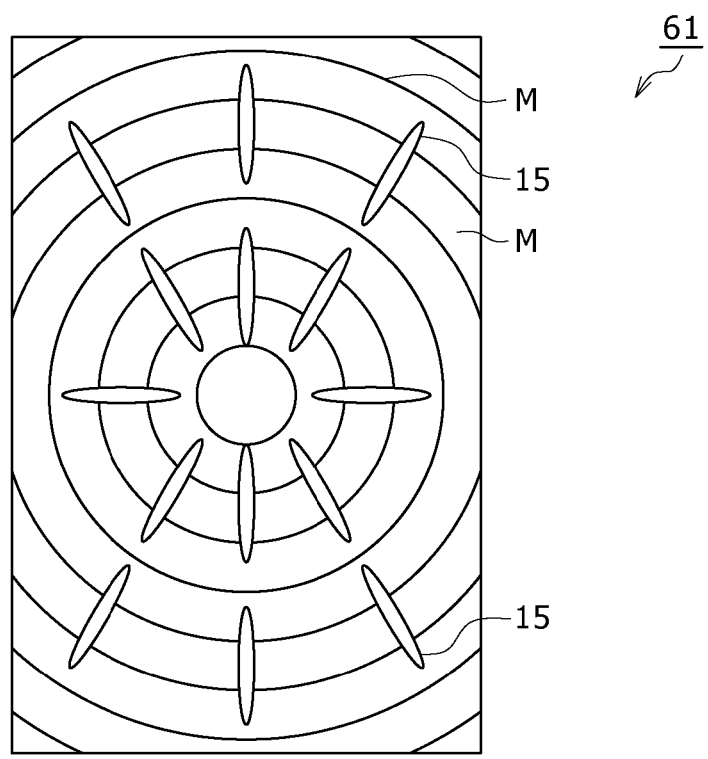
FIG. 18 is a schematic plan view showing a sixth embodiment of the liquid crystal display according to the present invention.

FIG. 18 is a plan view showing a liquid crystal display panel applied to a liquid crystal display according to Embodiment 6 of the present invention, in contrast to FIG. 15. This liquid crystal display panel 61 is configured in the same manner as the liquid crystal display panel 51 in Embodiment 5 above, except that the grooves M are formed in the shape of concentric circles. In this case, a conical projection is provided at the center of one pixel, in place of the tetragonal pyramidal projection mentioned above.

According to this embodiment, with the grooves formed in the shape of concentric circles, also, the same effects as in Embodiment 5 above can be obtained.

<Second Configuration of the Present Invention>

Now, embodiments according to the second configuration of the present invention will be described in detail below, referring to the drawings.

Figure 19:
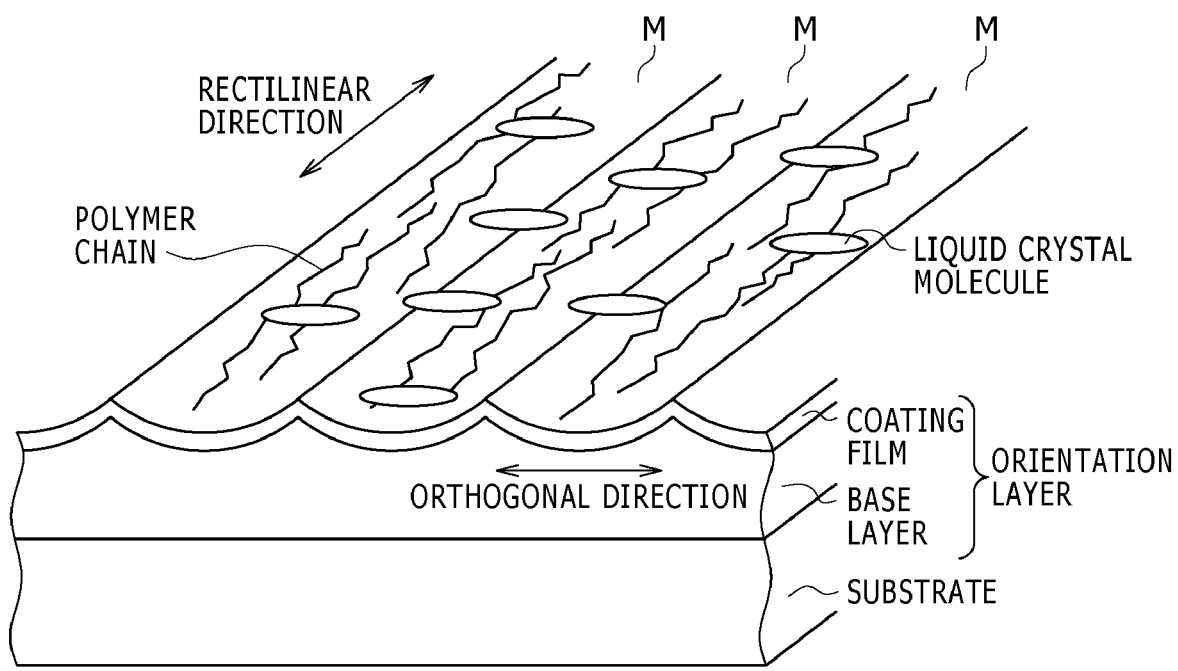
FIG. 19 is a partial perspective view of an essential part of the liquid crystal display according to the present invention.

FIG. 19 is a schematic partial perspective view showing an essential part of a liquid crystal display based on an embodiment of the present invention. The liquid crystal display based on an embodiment of the present invention basically includes a pair of substrates joined to each other with a predetermined gap therebetween, and a liquid crystal held in the gap. FIG. 19 shows one of the substrates and liquid crystal molecules present in the vicinity of a surface of the one substrate. An orientation layer for orienting the liquid crystal molecules is formed on at least one of the substrates. Incidentally, though not shown in the figure, electrodes for impressing a voltage on the liquid crystal are formed on at least one of the pair of substrates.

The orientation layer has a composite structure composed of a base layer provided with a plurality of grooves M in parallel, and a coating film covering the grooves M. It is to be noted here that the plurality of grooves M may not necessarily be geometrically strictly parallel to each other, and it suffices for the grooves M to be generally or substantially parallel in such a range as to exhibit their actions or effects intended in the present invention. The grooves M each extend in a predetermined direction, and are arrayed repeatedly at a given pitch along the orthogonal direction which is orthogonal to the predetermined direction, i.e., the extension direction of the grooves. Hereinafter, the predetermined direction will in some cases be referred to as "the rectilinear direction". It is to be noted here, however, the grooves may not necessarily have the rectilinear shape, and may have a curved shape as will be described later. The coating film includes, for example, a polymer film of a polyimide resin or the like, and has a horizontally orienting ability by which the molecular major axes indicative of the longitudinal directions of the liquid crystal molecules are oriented in parallel to the substrates under the condition where no voltage is impressed. When the base layer provided with the stripe-shaped grooves (grating) is coated with the polymer coating film, the polymer chains are aligned along the grating. The polymer chains thus aligned produces an orientation control force for the liquid crystal molecules. Therefore, the liquid crystal molecules can be controlledly oriented, without rubbing. This is the orientation control by the combined effect of the coating film and the base layer. Though depending on the treatment conditions, the polymer chains in the example shown are aligned along the rectilinear direction of the grooves M. In some cases, the polymer chains may possibly be aligned in the orthogonal direction with respect to the grating, by a uniaxial orientation effect at the time of curing of the coating film on the base layer.

The orientation layer having the composite structure in which the coating film and the base layer are laminated performs different kinds of orientation control over the liquid crystal molecules, depending on the aspect ratio of the grating. As has been above-mentioned, the aspect ratio represents the ratio of the depth of the grating to the array pitch of the grating. The composite orientation layer according to an embodiment of the present invention has such a property that the molecular major axes of the liquid crystal are horizontally oriented in random directions when the aspect ratio is below a predetermined lower limit (when the grooves of the grating are too shallow). This random orientation is similar to the orientation state obtained without rubbing the polyimide orientation film, and the effect of the grating is not exhibited because the grooves are too shallow. On the other hand, when the aspect ratio is above a predetermined upper limit (when the grooves of the grating are too deep), the molecular major axes of the liquid crystal are horizontally oriented in the rectilinear direction of the grooves (in parallel to the grooves). This parallel orientation is similar to the state obtained by the grating orientation according to the related art, wherein the orientation is governed entirely by an orientation control force (anchoring force) due to the grating, and the combined effect of the coating film and the base layer is not being exhibited.

When the aspect ratio of the grating is in the range between the lower limit and the upper limit (when the grating has an appropriate shape, without being too shallow or too deep), the molecular major axes of the liquid crystal are horizontally oriented in the orthogonal direction with respect to the grooves. This orthogonal orientation is indeed a novel orientation state obtained by the combined effect of the grating base layer and the orientation film, and is superior in stability and uniformity to the parallel orientation obtained by the grating according to the related art. The orientation layer according to an embodiment of the present invention has an aspect ratio suppressed as compared with that of the grating orientation layer in the related art, and is therefore superior in productivity to the grating orientation layer in the related art. In the liquid crystal display according to an embodiment of the present invention, the base layer is provided with the grating such that the aspect ratio is within the range between the lower limit and the upper limit, and the grating is covered with the orientation coating film. This configuration makes it possible to realize a liquid crystal display being higher in productivity, having a more stable orientation control force and being able to secure a higher image quality, as compared to those according to the related art.

Figure 20A:
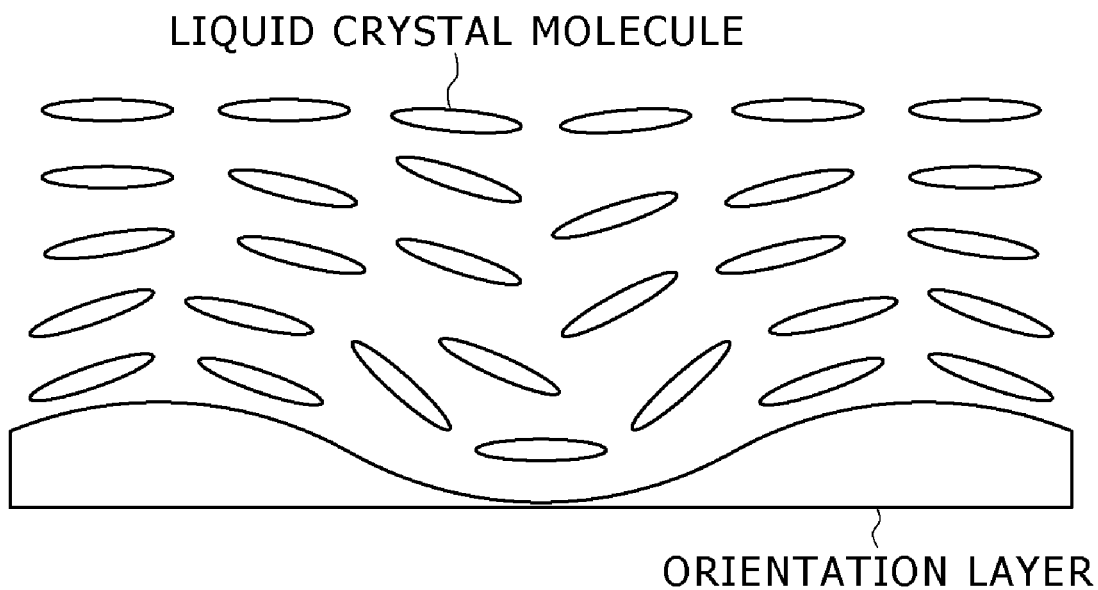
FIGS. 20A and 20B are schematic illustrations for use in describing an embodiment of the present invention.
Figure 20B:
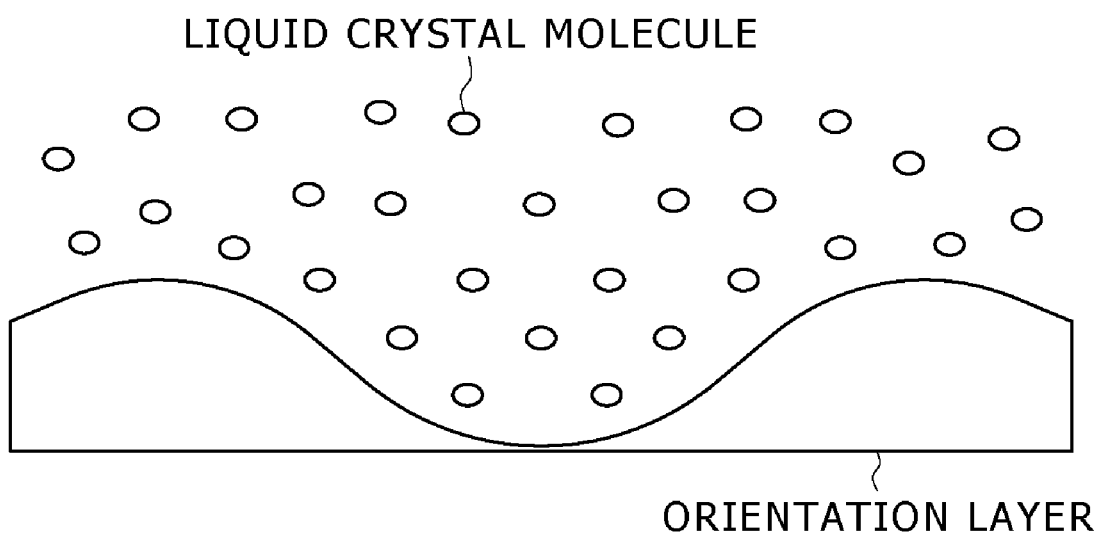

FIGS. 20A and 20B schematically show the orientation conditions of the liquid crystal molecules, wherein FIG. 20A corresponds to the orthogonal orientation, and FIG. 20B corresponds to the horizontal orientation. Each of FIGS. 20A and 20B is a sectional view taken along the orthogonal direction with respect to the grating, and a recess and protuberances corresponding to the grating are appearing in the orientation layer. In the orthogonal orientation, as shown in FIG. 20A, the liquid crystal molecules are aligned in parallel to the orthogonal direction with respect to the grating. In the parallel orientation, as shown in FIG. 20B, the liquid crystal molecules are aligned in the rectilinear direction of the grating (the direction perpendicular to the paper surface). When the aspect ratio of the grating is appropriately set in the range between the lower limit and the upper limit, the liquid crystal molecules are orthogonally oriented as shown in FIG. 20A, by the combined effect of the grating base layer and the horizontally orienting coating film. On the other hand, when the aspect ratio of the grating exceeds the upper limit and the anchoring effect of the grating alone becomes dominant, as shown in FIG. 20B, the liquid crystal molecules are transferred into the parallel orientation in the same manner as in the grating orientation according to the related art.

Figure 21:
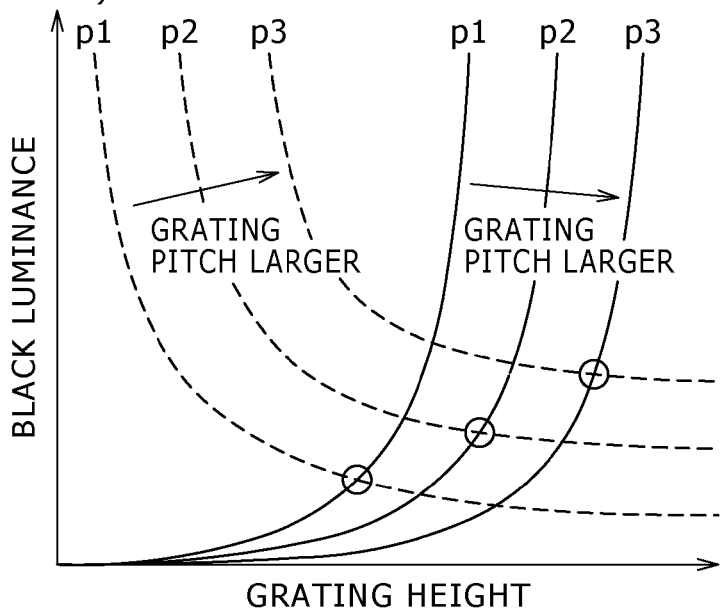
FIG. 21 is a graph for use in describing an embodiment of the present invention.
Figure 23A:
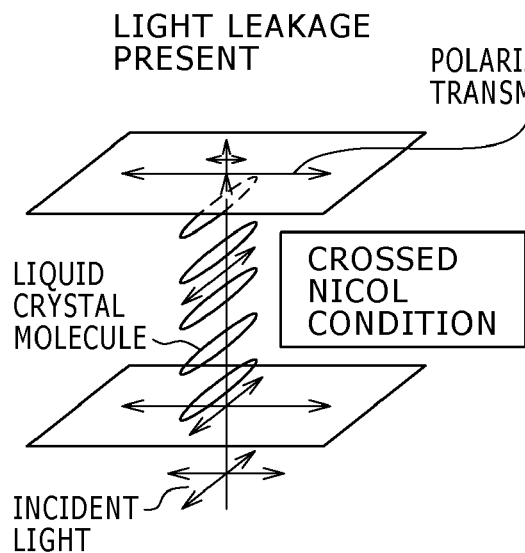
FIG. 23 is a schematic illustration for use in describing an embodiment of the present invention.

FIG. 21 is a graph showing the relationship between the grating height and the black luminance of the liquid crystal display. Here, the liquid crystal display has a structure in which the relation between the upper and lower polarizing plates and the liquid crystal molecule orientation direction is as schematically illustrated in FIG. 23A, wherein the liquid crystal molecules are oriented by the rubbing orientation at one of the substrates and by the grating orientation at the other substrate. Homogeneous orientation of the liquid crystal molecules is being achieved because the rubbing direction is set in the direction orthogonal to the grating. The black luminance in the graph represents the luminance of the liquid crystal screen in the condition where no voltage is impressed, and is an index of the orientation state of the liquid crystal. A lower black luminance (a darker screen) indicates that the orthogonal orientation state of the liquid crystal is more uniform and stable.

In this graph, the pitch of the grating is taken as a parameter, and the pitch increases in the order of P1, P2, and P3. The three solid-line curves represent orientation states generated by the elastic strain effect (anchoring force) of the grating itself. As has been above-mentioned, the elastic strain effect basically has the property of orienting the liquid crystal molecules in parallel to the grating. As is clear from the graph, as the grating becomes higher (as the grooves become deeper), the elastic strain effect of the grating itself becomes stronger, so that the liquid crystal undergoes transition from the orthogonal orientation to the parallel orientation, and, as a whole, a change from homogeneous orientation to twisted orientation occurs. Since the orthogonal orientation is lost in this manner, the black luminance is raised (the screen fades to white).

On the other hand, the three dotted-line curves represent orientation states generated by the effect intrinsic of the present invention. The effect intrinsic of the present invention is an aligning effect which the grating of the base layer has on the polymer chains in the polymer coating film composed of a polyimide (PI) or the like, whereby the liquid crystal molecules are oriented orthogonally to the grating. As is clear from the graph, as the grating becomes higher (as the grating becomes deeper), the polyimide (PI) coating film is thereby aligned, the liquid crystal molecules are put into the orthogonal orientation, the black luminance is lowered, and a more uniform and stable orientation state is obtained. When the grating is too shallow, the aligning effect of the grating on the polymer of the PI coating film is not exhibited, so that the liquid crystal is put into random orientation, and the black luminance is raised. Therefore, a lower limit exists as to the aspect ratio of the grating, and the grating has to be formed in such a range that the polymer aligning effect of the grooves is exhibited.

Thus, the present invention is characterized in that orientation control over the liquid crystal molecules is conducted by utilizing the range in which the orthogonally orienting ability of the composite orientation layer of the grating base layer and the polymer coating film is dominant. Theoretically, it is considered that the orthogonally orienting ability is stronger as the grating is higher. However, as the grating is set to be higher, the parallel orienting ability of the grating itself is also augmented to eventually overcome the orthogonally orienting ability, resulting in that the parallel orienting ability is dominant. Therefore, an upper limit is present as to the aspect ratio of the grating, and the grating has to be formed in such a range that the parallel orienting ability does not become dominant.

Figure 22:
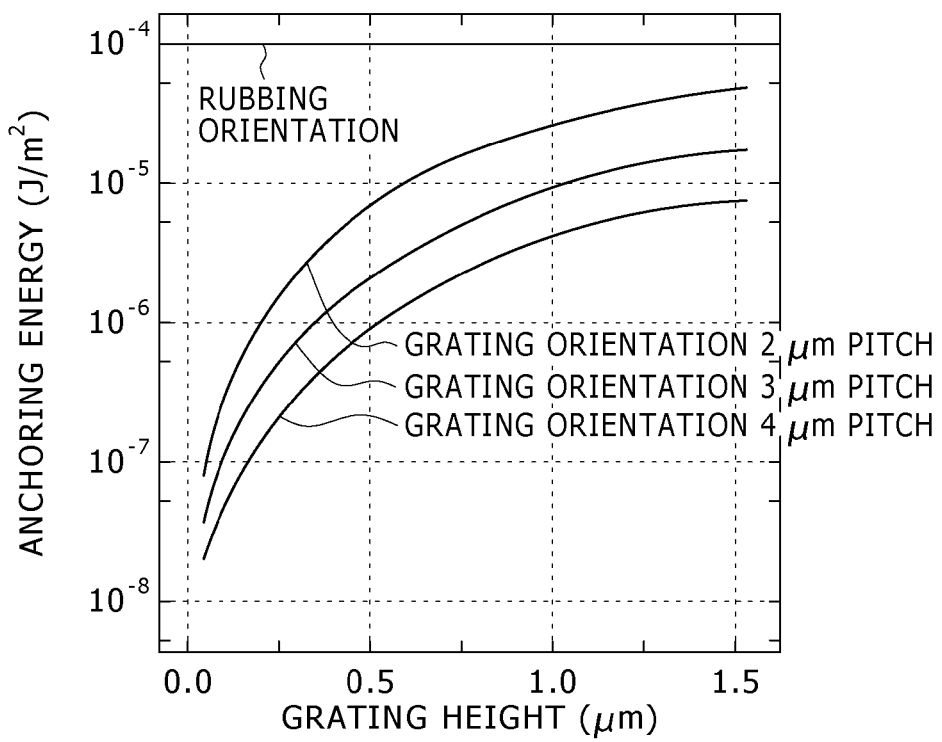
FIG. 22 is a graph for use in describing an embodiment of the present invention.

FIG. 22 is a graph showing the relationship between the grating height and the anchoring energy. The anchoring energy represents the strength of the elastic strain effect of the grating itself, and the parallel orientation state of the liquid crystal is more stabilized as the anchoring energy is augmented. In the graph, the anchoring energy obtained by the rubbing orientation according to the related art is also shown. In this graph, the grating pitch is taken as a parameter, and is set at values of 2 μm, 3 μm, and 4 μm. It is clearly seen from the graph that as the grating is made higher, the anchoring energy is increased, the degree of parallel orientation of the liquid crystal is increased, and the liquid crystal approaches the rubbing orientation state. In the present invention, the aligning effect of the grating on the coating film polymer is utilized, but it is necessary to control the aspect ratio of the grating to within such a region that the elastic strain effect of the grating itself does not become dominant.

Figure 23B:
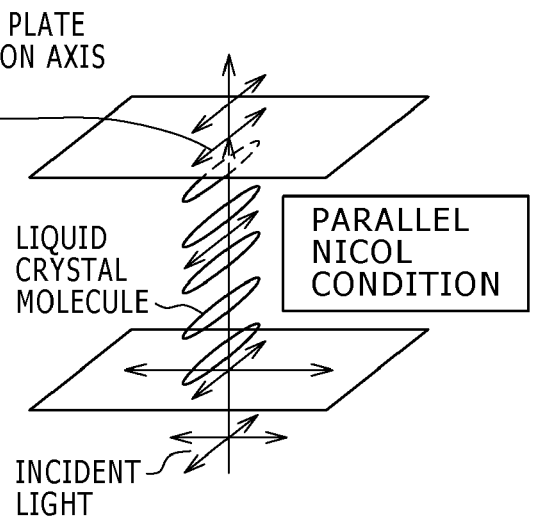

FIGS. 23A and 23B schematically illustrate orientation states of a liquid crystal held between a pair of substrates. As shown, the molecular major axes of the liquid crystal are horizontally oriented while being aligned in a fixed direction. Hereinafter, this orientation state will in some cases be referred to as "the homogeneous orientation". In addition, hereinafter, the alignment direction of the molecular major axes of the liquid crystal will in some cases be referred to as "the orientation direction". Therefore, the orthogonal orientation intrinsic of an embodiment of the present invention is the homogeneous orientation in which the orientation direction coincides with the orthogonal direction with respect to the grating.

In the liquid crystal display, the orientation control of the liquid crystal is conducted by use of the orientation layer, and the voltage to be impressed is controlled, whereby the orientation state is switched, to thereby display a desired image. The change in the orientation state can be converted into a change in luminance by an upper-lower pair of polarizing plates, for example. FIG. 23A illustrates a crossed nicol arrangement of the pair of polarizing plates, wherein the transmission axes of the upper and lower polarizing plates are orthogonal to each other. The transmission axis of the polarizing plate on the lower side in the figure, i.e., on the incidence (incoming) side, is parallel to the orientation direction of the liquid crystal. The transmission axis of the polarizing plate on the emission (outgoing) side is orthogonal to the orientation direction of the liquid crystal. When the liquid crystal is in an ideal homogeneous orientation, the incident light is perfectly interrupted by the pair of polarizing plate, and light leakage is zero. Therefore, black display is obtained.

FIG. 23B illustrates a parallel nicol arrangement of a pair of polarizing plates. In the parallel nicol condition, the transmission axes of the upper and lower polarizing plates are parallel to the orientation direction of the liquid crystal. In this case, the incident light is emitted as it is, without being absorbed. Therefore, white display is obtained. A normally white display is obtained when the parallel nicol arrangement is adopted in the condition where no voltage is impressed. On the contrary, a normally black display is obtained when the crossed nicol arrangement is adopted in the condition where no voltage is impressed.

Figure 24:
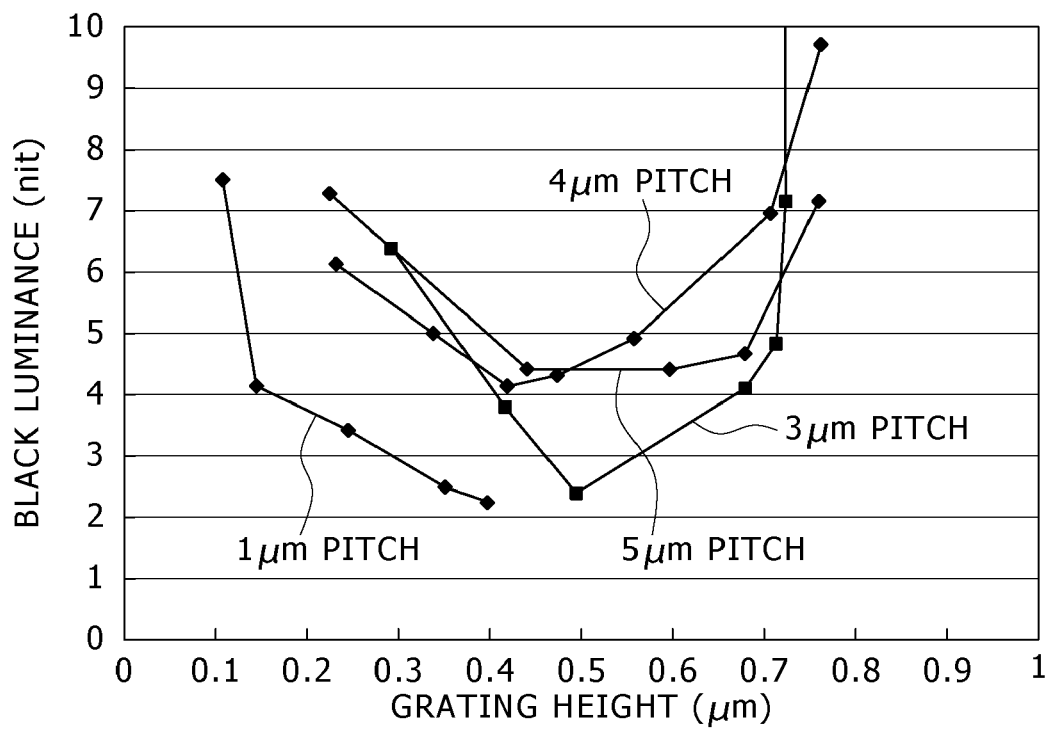
FIG. 24 is a graph for showing the effects of an embodiment of the present invention.

FIG. 24 is a graph showing the effects of the embodiment of the present invention, specifically, showing the results of measurement of the relationship between grating height and black luminance for samples of liquid crystal display which corresponded to the orientation model shown in FIG. 23A and which were fabricated by use of different grating pitches. In the graph, the grating height (μm) is taken on the axis of abscissas, and the black luminance (nit) is taken on the axis of ordinates. It is seen that, in the sample with a groove array pitch of 5 μm, the black luminance was at a low level when the grating height was in the range of 0.3 to 0.7 μm, where a stable and uniform orthogonal orientation can be obtained. When the grating height is 0.3 μm or below, the liquid crystal is put into random orientation and, hence, the black luminance is raised. Further, when the grating height exceeds 0.7 μm, the orthogonal orientation is lost and transition to the parallel orientation occurs, so that the black luminance is raised.

In the sample with a grating array pitch of 4 μm, a uniform and stable orthogonal orientation state was obtained when the grating height (groove depth) was in the range of 0.2 to 0.7 μm. Besides, in the sample with a grating array pitch of 3 μm, the black luminance was at a low level and a uniform and stable orthogonal orientation was obtained when the grating height was in the range of 0.4 to 0.7 μm. In addition, in the sample with a grating pitch of 1 μm, the black luminance was at a low level and a stable orthogonal orientation was obtained when the grating height (groove depth) was in the range of more than 0.1 μm.

From the results shown in FIG. 24, it is presumed, as a general tendency, that a uniform and stable orthogonal orientation can be obtained when the aspect ratio is in the range of 0.05 to 0.5. Preferably, by setting the groove depth in the range of 0.1 to 0.7 μm when the groove array pitch is in the range of 1 to 5 μm, the molecular major axes of the liquid crystal are horizontally oriented in the orthogonal direction with respect to the grooves.

Figure 25:
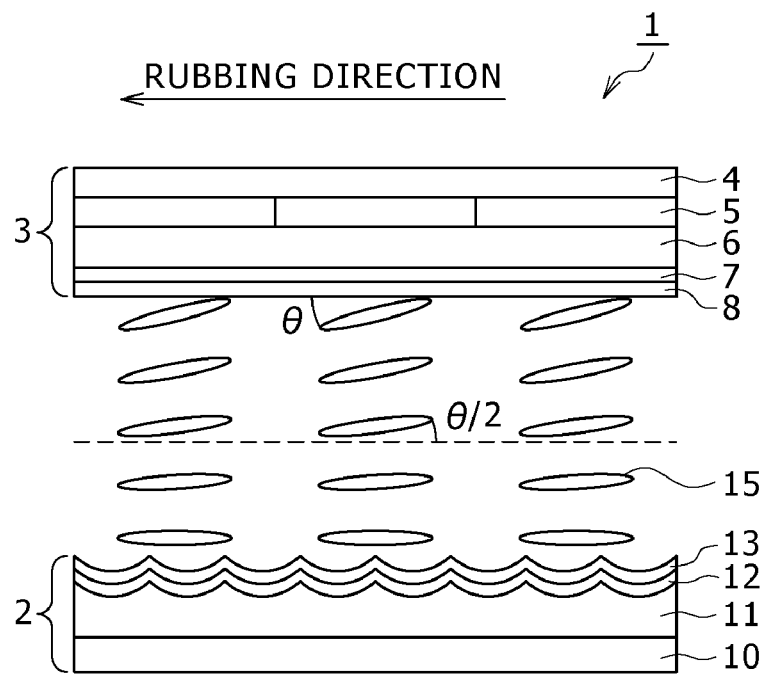
FIG. 25 is a schematic sectional view showing the seventh embodiment of the liquid crystal display according to the present invention.

FIG. 25 is a schematic sectional view showing a seventh embodiment (Embodiment 7) of the liquid crystal display according to the present invention. The liquid crystal display in this embodiment is of the so-called transmission type or reflection type, wherein a polarizing plate and the like are provided at least on the face side, or the upper side in FIG. 25, of a liquid crystal display panel 1. Besides, in the transmission type, a backlight device is provided on the back side, or the lower side in FIG. 25, of the liquid crystal display panel 1. In the reflection type, a front light device is provided on the face side, or the upper side in FIG. 25, of the liquid crystal display panel 1.

The liquid crystal display panel 1 has a liquid crystal sandwiched between a TFT array substrate 2 and a CF substrate 3. Here, the CF substrate 3 is fabricated by sequentially forming a color filter 5, an insulating film 6, an electrode 7 composed of a transparent electrode, and an orientation film 8 over a glass substrate 4 serving as a transparent insulating substrate. The electrode 7 is ordinarily formed by forming a film of ITO (Indium Tin Oxide) over the whole surface area, but may be patterned on the basis of each pixel or on the basis of each sub-pixel. In addition, the orientation film 8 is formed by a method in which a mixture of polyamic acid and a soluble polyimide as a liquid crystal orienting material for inducing horizontal orientation is applied by a printing process, followed by baking at a temperature of 200° C. for 75 min to form a polyimide thin film in a thickness of 50 nm, and then a rubbing treatment is conducted to impart an orienting ability to the polyimide thin film. Incidentally, the direction of the rubbing treatment is the direction of arrow in the figure, which is orthogonal to the extension direction (rectilinear direction) of grooves M to be described later.

Figure 26:
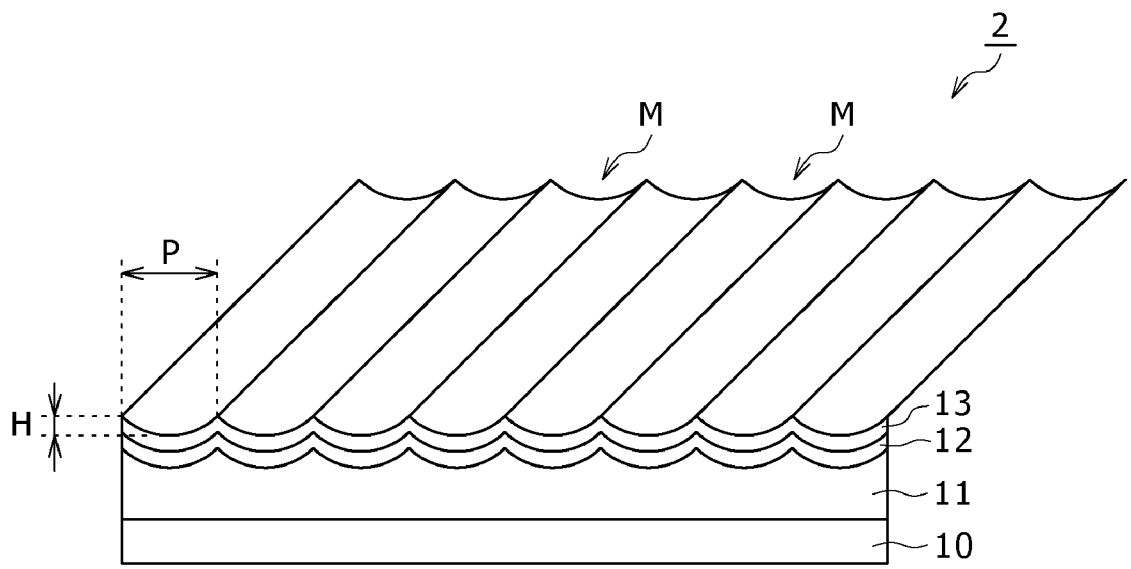
FIG. 26 is a schematic perspective view showing the seventh embodiment.

On the other hand, the TFT array substrate 2 is fabricated by a method in which, as shown in FIG. 26, TFTs and the like are formed and an insulating film 11 is formed over a glass substrate 10 serving as a transparent insulating substrate, and an electrode 12 and an orientation film 13 are sequentially formed over the insulating film 11. As is clear from the above description, the insulating film 11, the electrode 12 and the orientation film 13 sequentially formed over the substrate 10 constitute the orientation layer in the present embodiment of the invention. Of these components, the insulating film 11 and the electrode 12 correspond to the base layer shown in FIG. 19, and the orientation film 13 corresponds to the coating film shown in FIG. 19.

In the TFT array substrate 2, the principal surface for forming the orientation film 13 thereon has a grooved shape in which grooves extending rectilinearly in a predetermined direction are arrayed repeatedly in the direction orthogonal to the predetermined direction, and the grooved shape is covered with a polymer film to form the orientation film 13. Besides, in this embodiment, the surface shape of the insulating film 11 is in this grooved shape, and the surface for forming the orientation film 13 thereon is formed in the grooved shape. Here, the grooves M each extend in a given rectilinear direction, and are arrayed repeatedly at a given pitch P along the orthogonal direction which is orthogonal to the rectilinear direction. The section of the insulating film 11 along the orthogonal direction has a recess-and-protuberance structure in which in which recessed parts each corresponding to the bottom of the groove M and protuberant parts each corresponding to the boundary between the adjacent grooves M appear alternately and repeatedly.

Here, the sectional shape of the groove M is an inverted circular arc shape which is symmetrical with the peak of the groove M as the center of symmetry. In addition, the grooves M are formed to have a pitch P of 1 μm and a height (depth) H of 0.4 μm. Besides, the ratio $T=H/P$ between the pitch P and the height H is 0.4, and it is set in a preferable aspect ratio range between 0.05 and 0.5. Incidentally, the sectional shape of the groove M in the liquid crystal display according to the present embodiment of the invention is not limited to the symmetrical shape such as a circular arc shape, and the groove may be asymmetrical in sectional shape.

More specifically, in the TFT array substrate 2, the insulating film 11 is formed by use of a novolak or acrylic or other organic resist material or by use of $SiO_2$, SiN or an inorganic material containing $SiO_2$ or SiN as a main constituent.

Here, in the case of forming the insulating film 11 by use of a photosensitive organic resist material, the TFT array substrate 2 is coated with the photosensitive organic resist material, followed by pre-baking, and then the resist material is exposed to UV rays or the like by use of a mask having a pattern (striped pattern) corresponding to the grooves M. Subsequently, development and post-baking are conducted, to process the surface of the insulating film 11 into the grooved shape through a photolithographic process. Incidentally, the exposure treatment may be conducted by utilizing interference of luminous fluxes incident from two different directions, in place of the use of a mask. In addition, the photolithographic process may be replaced by other technique, such as a nano-imprinting process.

In the case of forming the insulating film 11 by use of an inorganic material, the inorganic material is deposited in a predetermined film thickness on the TFT array substrate 2 by vacuum evaporation, sputtering, CVD or the like, followed by a photolithographic process to pattern a photosensitive organic resist material into a grooved shape, and then wet etching or dry etching is conducted to form the surface on the side of the orientation film 13 into a grooved shape. In addition, the insulating film 11 can also be formed by use of a commercially available photosensitive material included of a mixture of an inorganic material and an organic material; in this case, after patterning by the photolithographic process, braking and the like steps are conducted, whereby the organic component is dissipated into the atmosphere, and an insulating film 11 composed mainly of the inorganic material is formed.

Besides, in the case of the transmission type, the electrode 12 is ordinarily formed by forming a film of a transparent electrode material such as ITO on the whole surface area, followed by patterning the film. Incidentally, in the case of the reflection type, the electrode 12 may be formed by applying such a metallic material as aluminum, silver, etc.

The orientation film 13 is formed by applying a generally used polyimide material by an offset printing process, followed by baking at a temperature of 200° C. for 75 min. Upon the baking of the orientation film 13, the polymer chains in the orientation film are aligned in a predetermined direction with respect to the grooves M, whereby an orienting ability is imparted to the orientation film 13. Incidentally, the method for applying the material of the orientation film 13 may be any of various techniques such as a spin coating process, a dipping process of dipping in a solution diluted with a solvent such as γ-butyrolactone, acetone, etc., a spraying process, etc. Incidentally, the material of the orientation film is not limited to polyimide, and may be other polymer such as polyvinyl alcohol (PVA), polystyrene, etc.

Here, in forming the orientation film 13, specifically, in the process of applying and baking the orienting material in the condition where the surface shape of the underlying layer is formed into a grooved shape, the polymer chains in the orientation film are aligned in a predetermined direction with respect to the grooves, whereby the orientation film 13 is provided with an orienting ability. One of the reason for this phenomenon is considered to lie in the fact that in the process of the temperature rise and fall during the baking, the substrate 10 expands and contracts, and the stresses due to the expansion and contraction produce a uniaxial orientation effect by acting in specified directions of the orientation film 13 depending on the grooved shape, whereby the polymer chains in the orientation film are aligned in a predetermined direction.

As a result of various investigations, it was found out that in order for the liquid crystal molecular axes to be aligned in a fixed direction by the baking after the application of material, grooves M extending in the direction orthogonal to the fixed direction needs to be preliminarily formed in the surface on the lower side of the orientation film 13, and the mere presence of simple projections or ruggedness results in that the molecular axes in the orientation film are aligned in directions from each crest toward the plain and that the orientation film 13 cannot be provided with the orienting ability in a specified direction.

As for the grooves M, the ratio T (=H/P) between the pitch P and the height H may be in the range between 0.05 and 0.5, whereby a sufficient orienting ability can be imparted to the orientation film. From the viewpoint of processing the surface on the lower side of the orientation film 13 into the grooved shape, enhanced productivity can be secured by setting the ratio T between the pitch P and the height H to be less than 0.5.

The liquid crystal display panel 1 is fabricated by adhering the TFT array substrate 2 and the CF substrate 3 to each other through a sealing material, and pouring a nematic liquid crystal having a positive dielectric constant anisotropy into the gap between the TFT array substrate 2 and the CF substrate 3. Incidentally, in FIG. 25, the liquid crystal molecules are denoted by symbol 15, and symbols θ and η/2 denote tilt angles of the liquid crystal molecules 15. In this case, when the liquid crystal was poured into the gap and the orientation directions of the liquid crystal molecules 15 were checked, it was confirmed that the liquid crystal molecules 15 were oriented in the direction orthogonal to the extension direction of the grooves M near the surface on the side of the TFT array substrate 2, and that when the TFT array substrate 2 and the CF substrate 3 were adhered to each other so that the extension direction of the grooves M was orthogonal to the rubbing direction, as shown in FIG. 25, the liquid crystal molecules 15 were in homogeneous orientation. Incidentally, it was also confirmed that when the TFT array substrate 2 and the CF substrate 3 were adhered to each other so that the extension direction of the grooves M was parallel to the rubbing direction, the liquid crystal molecules 15 were in twisted nematic orientation.

Figure 27:
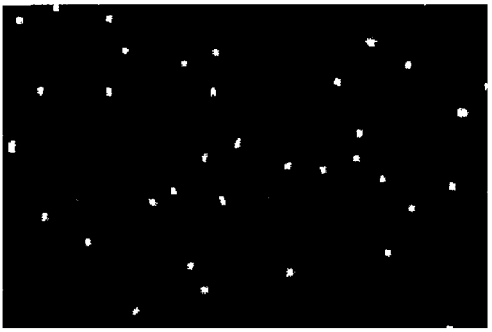
FIG. 27 shows a polarizing light microphotograph of the liquid crystal display according to the seventh embodiment.

FIG. 27 shows a polarizing light microphotograph of one-pixel portion of the liquid crystal display panel 1, showing the results of observation of the condition where a pair of polarizing plates are set in the above-mentioned crossed nicol arrangement and the liquid crystal display panel 1 with the homogeneous orientation was disposed between the polarizing plates. As is clear from the figure, the liquid crystal display panel 1 based on the embodiment of the present invention has a very good liquid crystal orientation characteristic under the crossed nicol condition. Incidentally, the white dots in the microphotograph reflect spacers for keeping constant the dimension of the gap between the pair of substrates.

Figure 28:
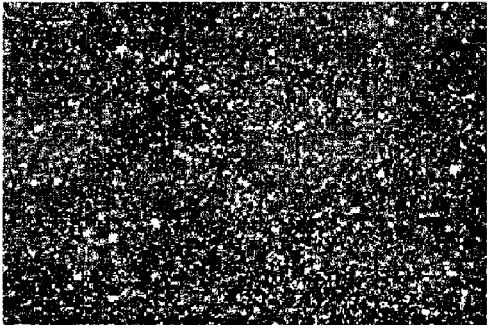
FIG. 28 shows a polarizing light microphotograph of the liquid crystal display according to the reference example.

FIG. 28 shows a polarizing light microphotograph of a liquid crystal display panel obtained by adopting the orienting method of the simple grating system according to the related art. In other words, the liquid crystal display panel of the grating system of the past was obtained by orienting the liquid crystal molecules by simply utilizing only the elastic strain effect of the grating, while omitting the orientation film 13 on the side of the TFT array substrate 2. According to the grating of the past, the liquid crystal molecules are oriented in parallel to the grooves; therefore, the rubbing treatment is carried out in parallel to the grooves, in order to obtain a liquid crystal display with homogeneous orientation. The microphotograph in FIG. 28 shows the results of observation of this liquid crystal display panel under the same crossed nicol condition as above.

In this case, when the optical axis of the liquid crystal display panel 1 is perfectly aligned, no phase change is generated in the light being incident from the polarizer, so that black display is obtained upon observation. However, when the optical axis is deviated locally, a grey or white pattern is observed. Referring to the observation results shown in FIGS. 27 and 28, the sample corresponding to FIG. 27 is observed to be more deeply black. From this it can be determined that the liquid crystal display panel according to the embodiment of the present invention is higher in liquid crystal orientation characteristic than the liquid crystal display panel obtained by the grating method according to the related art in which the liquid crystal molecules are put into homogeneous orientation by simply utilizing only the elastic strain effect.

In addition, the liquid crystal display panel 1 of this embodiment can be manufactured while using various excellent-characteristic materials and, further, can realize the orienting ability easily and securely. Consequently, this embodiment makes it possible, in carrying out the grating method, to effectively obviate the various problems encountered in the configurations of the past based on the utilization of the orientation control force possessed by the orientation film itself.

Besides, from the observation results shown in FIGS. 27 and 28, it has been confirmed that while the liquid crystal molecules were oriented in the direction orthogonal to the extension direction of the grooves M on the side of the TFT array substrate 2 in the liquid crystal display panel 1 according to this embodiment, the liquid crystal molecules were oriented in the direction parallel to the extension direction of the grooves M on the side of the TFT array substrate 2 in the liquid crystal display panel obtained by the grating method according to the related art. This means that the orientation of the liquid crystal molecules 15 under the function of the orientation film 13 in this embodiment is different from the orientation by the grating method of the related art based on the utilization of the elastic strain effect.

In addition, the tilt angle of the liquid crystal cell in the state of homogeneous orientation was measured by the crystal rotation method, to be about 1.5 degrees. Here, the tilt angle of a liquid crystal cell in the case where both the TFT array substrate 2 and the CF substrate 3 are subjected to the rubbing treatment is about 3 degrees. Therefore, it is considered that, in the liquid crystal display panel 1 according to this embodiment, the tilt angle θ at the surface of the CF substrate 3 is 3 degrees, and the tilt angle at the surface of the TFT array substrate 2 is 0 degrees.

Figure 29:
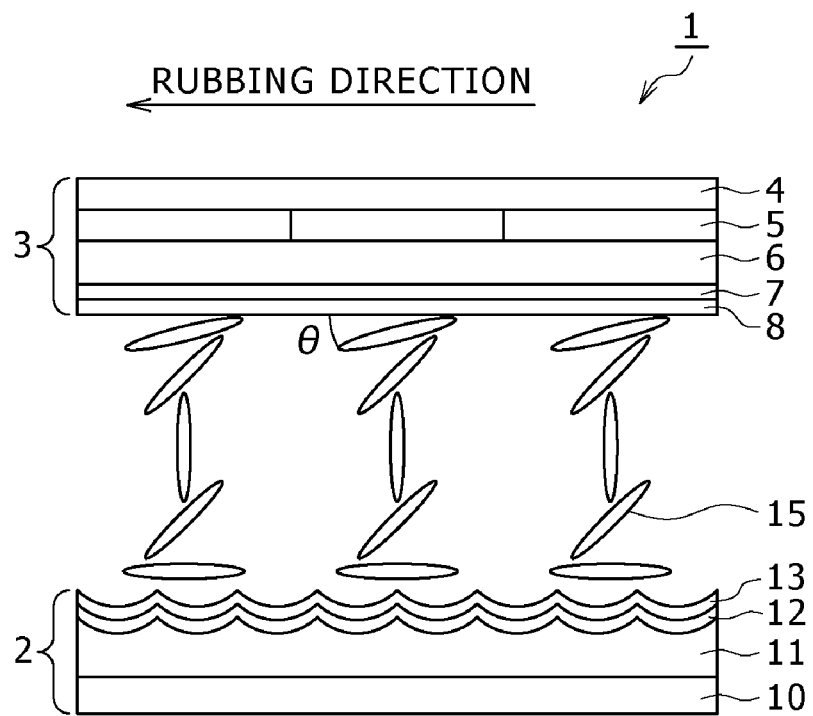
FIG. 29 is a schematic sectional illustration for use in describing an operation of the liquid crystal display according to the seventh embodiment.

FIG. 29 illustrates schematically the case where a voltage is impressed on this liquid crystal display panel 1. Even upon application of a voltage to the liquid crystal display panel 1, the orientation of the liquid crystal molecules is not changed in the vicinity of the interfaces of the TFT array substrate 2 and the CF substrate 3, the tilt angle of the liquid crystal molecules 15 is gradually increased as one goes away from the interfaces, and the tilt angle reaches a maximum of about 90 degrees at a central portion of the gap between the TFT array substrate 2 and the CF substrate 3.

The retardation upon application of the voltage was measured by the rotating analyzer method, and was compared with the retardation of a liquid crystal cell obtained by subjecting both the TFT array substrate 2 and the CF substrate 3 to the rubbing treatment. Here, in the case where the anchoring strength is low, the tilt angle of the liquid crystal molecules at the interface on the side of the TFT array substrate 2 is changed by the impressing of the voltage. Therefore, the retardation measured here would be smaller than the retardation of the liquid crystal cell obtained by subjecting both the TFT array substrate 2 and the CF substrate 3 to the rubbing treatment. However, upon impressing the voltage, the liquid crystal display panel 1 of this embodiment showed a retardation comparable to the retardation of the liquid crystal cell obtained by subjecting both the TFT array substrate 2 and the CF substrate 3 to the rubbing treatment. From this it was confirmed that a sufficient anchoring strength was secured by the function of the orientation film 13 present on the side of the TFT array substrate 2.

Incidentally, while the case where the orientation film 13 on the TFT array substrate 2 and the orientation film 8 on the CF substrate 3 are provided with the orienting ability respectively by the grooved shape and the rubbing treatment has been described in Embodiment 7 shown in FIG. 25 above, the present invention is not limited to this configuration. On the contrary, the orientation film 13 on the TFT array substrate 2 and the orientation film 8 on the CF substrate 3 may be provided with the orienting ability by the rubbing treatment and the grooved shape, respectively. Further, both the orientation films 13, 8 on the TFT array substrate 2 and the CF substrate 3 may be provided with the orienting ability by the grooved shape. In addition, while the case of applying a nematic liquid crystal has been described in the embodiment of FIG. 25 above, the present invention is widely applicable to various liquid crystals such as smectic and cholesteric liquid crystals.

Figure 30:
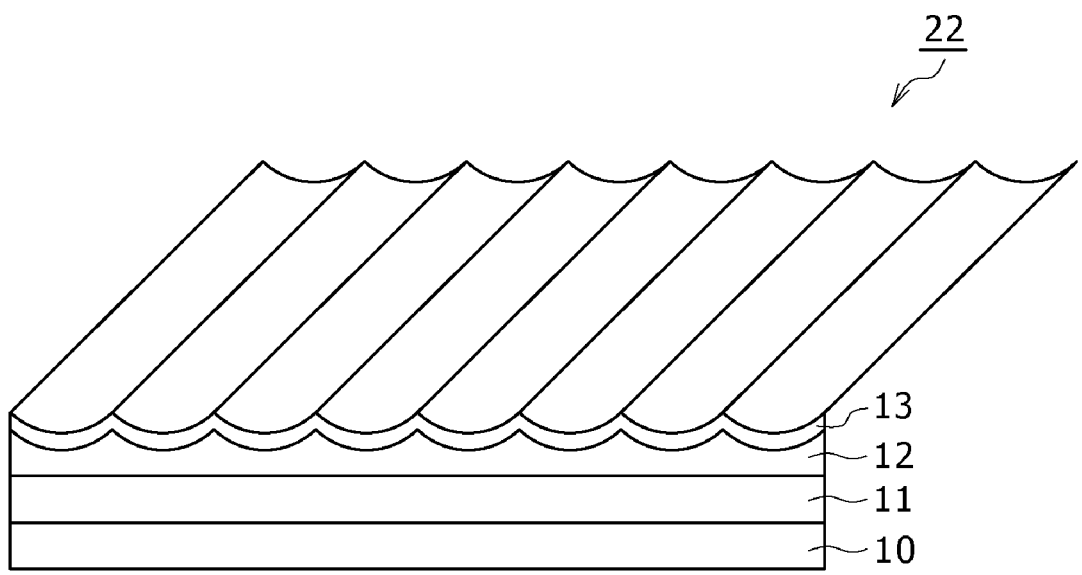
FIG. 30 is an essential part perspective view showing the eighth embodiment of the liquid crystal display according to the present invention.

FIG. 30 is a perspective view showing a TFT array substrate of a liquid crystal display panel applied to Embodiment 8 of the present invention, in contrast to FIG. 26. This TFT array substrate 22 has a structure in which, in place of the surface shape of the insulating film 11, the surface shape of the electrode 12 is formed in a grooved shape, so that the surface for forming the orientation film 13 thereon is formed in the grooved shape. The liquid crystal display panel in this embodiment is the same as the liquid crystal display panel in Embodiment 7, except for the point relating to the processing for forming this grooved shape.

Specifically, in fabricating the TFT array substrate 22 in this embodiment, an insulating film 11 is formed in a predetermined thickness on a glass substrate 10 in the same manner as in Embodiment 7 above. Subsequently, a film of ITO, aluminum, silver or the like is formed, a photoresist is patterned into a shape of grooves by a photolithographic process, and the electrode 12 is formed into a grooved shape by a wet etching treatment or a dry etching treatment. Incidentally, the configuration shown in FIG. 30 may be applied to the CF substrate, in the same manner as mentioned in Embodiment 7 above.

When the surface for forming the orientation film thereon is formed into a grooved shape by forming the surface shape of the electrode 12 into the grooved shape in place of the surface shape of the insulating film, as in this embodiment, also, the same effects as in Embodiment 7 can be obtained.

Figure 31:
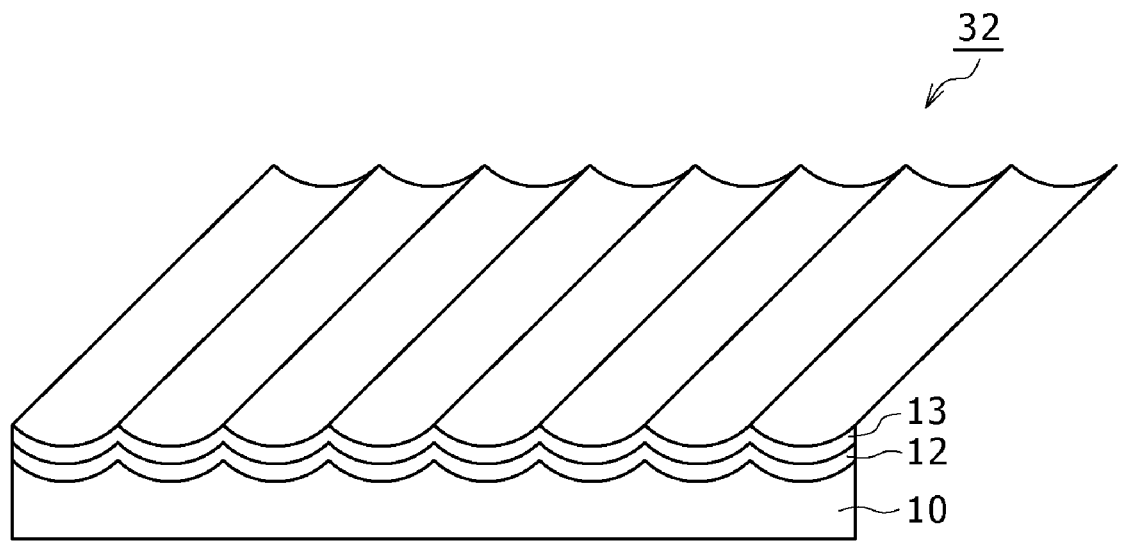
FIG. 31 is an essential part perspective view showing the ninth embodiment of the liquid crystal display according to the present invention.

FIG. 31 is a perspective view showing a TFT array substrate of a liquid crystal display panel applied to a liquid crystal display according to Embodiment 9 of the present invention, in contrast to FIG. 26. This TFT array substrate 32 has a structure in which, in place of the surface shape of the insulating film 11, the surface shape of a glass substrate 10 serving as an insulating substrate is directly formed into a grooved shape, whereby the surface for forming an orientation film 13 thereon is formed into the grooved shape. The liquid crystal display panel in this embodiment is the same as the liquid crystal display panel 1 in Embodiment 7 above, except for the point relating to the processing for forming the grooved shape. Incidentally, while the insulating film is omitted in the embodiment shown in FIG. 31, the insulating film may be provided, as required.

Specifically, in fabricating the TFT array substrate 32, a photoresist is patterned into a grooved shape by a photolithographic process on the face side of a glass substrate 10, and then a wet etching treatment or a dry etching treatment is conducted, to process the face-side surface of the glass substrate 10 into a grooved shape. Thereafter, an electrode 12 and an orientation film 13 are sequentially formed. Incidentally, the configuration shown in FIG. 31 may be applied to the CF substrate, in the same manner as in Embodiment 7 above. While the orientation film is formed over the base layer with the electrode therebetween in Embodiments 7 to 9, the present invention is not limited to this configuration; in some cases, the orientation film may be formed directly on the base layer.

When the surface for forming the orientation film thereon is formed into a grooved shape by forming the surface shape of the insulating substrate into the grooved shape in place of the surface shape of the insulating film, as in this embodiment, also, the same effects as in Embodiment 7 above can be obtained.

Figure 32:
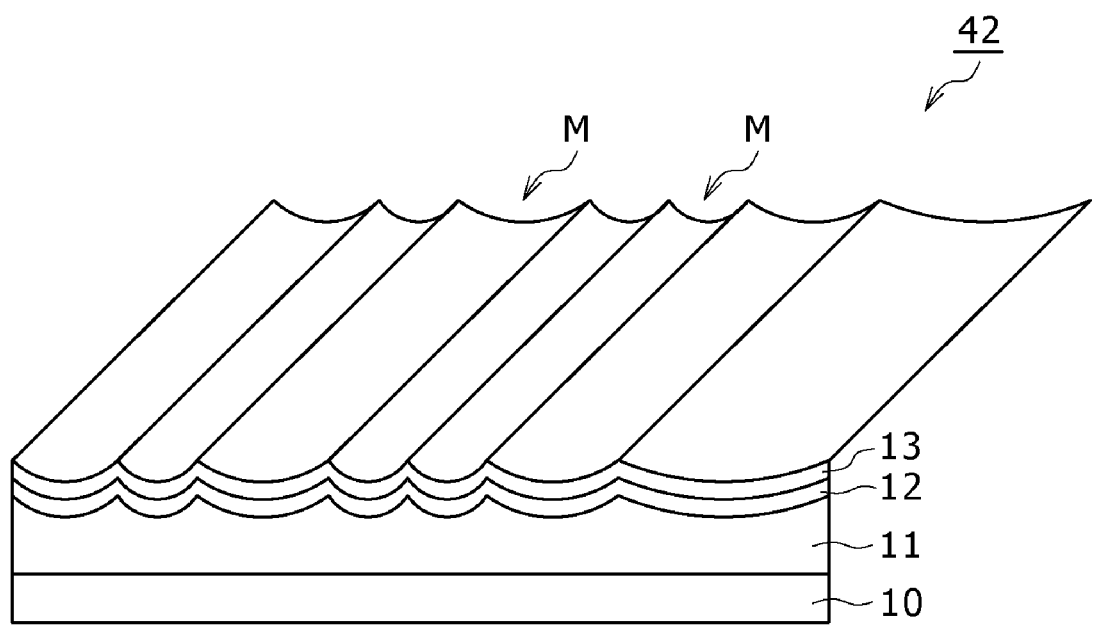
FIG. 32 is an essential part perspective view showing the tenth embodiment of the liquid crystal display according to the present invention.

FIG. 32 is a perspective view showing a TFT array substrate 42 applied to a liquid crystal display according to Embodiment 10 of the present invention, in contrast to FIG. 26. In fabricating this TFT array substrate 42, grooves M are so formed that more than a predetermined number of grooves M are not formed in succession at a fixed pitch P. More specifically, in the TFT array substrate 42, the groove pitch P is varied at random in a succession of the grooves M. This ensures that the successive grooves M in the TFT array substrate 42 do not function as a diffraction grating. The liquid crystal display panel in this embodiment is configured in the same manner as in the above-described embodiments, except for the difference in the setting of the groove pitch P in the TFT array substrate 42.

To be more specific, in the case where the grooves M are formed at a fixed pitch P, the periodic grooves M function as a diffraction grating, so that a rainbow-colored interference fringe is seen, resulting in marked degradation of image quality. In the case of a transmission type liquid crystal display panel, the orientation film is in contact with the liquid crystal which has a refractive index of about 1.5. Since the refractive index of the transparent electrode such as ITO is about 2, therefore, a rainbow-colored interference fringe is generated, though not so severely as in the case where the grooves M are exposed to the air. Besides, the rainbow-colored interference fringe is more conspicuous in the case of a reflection type liquid crystal display panel.

On the other hand, when the groove pitch P is varied at random as in this embodiment so that more than a predetermined number of grooves M are not present in succession at a fixed pitch P, it is possible to prevent the generation of such a rainbow-colored interference fringe and to prevent the image quality from being degraded.

Figure 33:
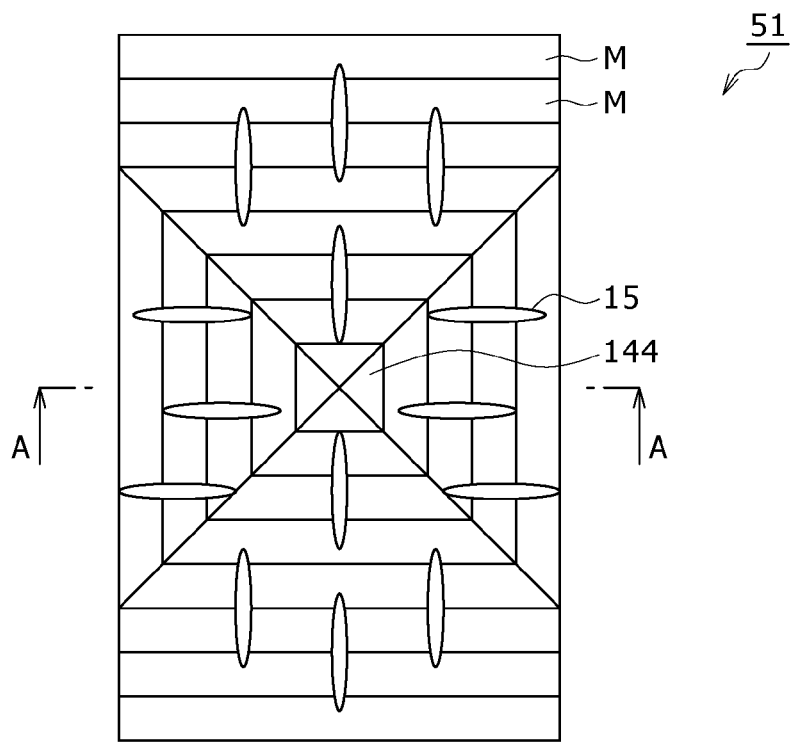
FIG. 33 is a plan view showing the eleventh embodiment of the liquid crystal display according to the present invention.
Figure 34:
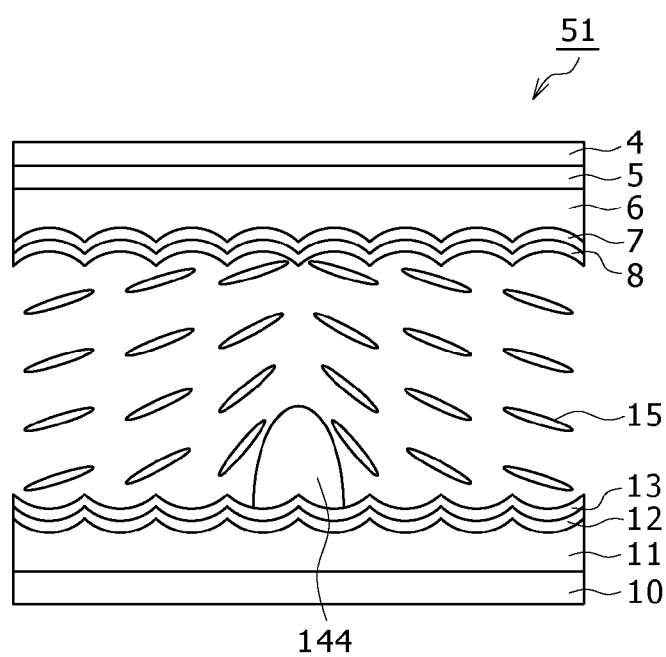
FIG. 34 is a sectional view showing the eleventh embodiment.
Figure 35:
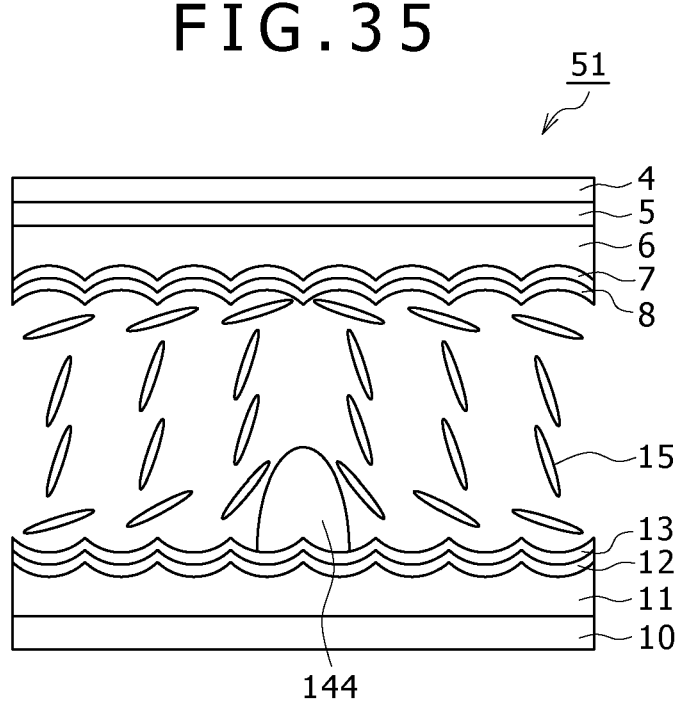
FIG. 35 is a sectional view showing the eleventh embodiment.

FIG. 33 is a plan view showing a liquid crystal display panel applied to a liquid crystal display according to Embodiment 11 of the present invention, and FIG. 34 is a detailed sectional view of the liquid crystal display panel 51 taken along line A-A of FIG. 33. In addition, FIG. 35 is a sectional view showing the condition where a voltage is impressed on electrodes, in contrast to FIG. 34. In the liquid crystal display panel 51 in this embodiment, the same components as those in the above-described embodiments are denoted by the same symbols as used above, and descriptions of them are omitted appropriately.

In the liquid crystal display panel 51, an orientation film 8 on a CF substrate and an orientation film 3 on a TFT array substrate are both provided with an orienting ability by way of a grooved shape. Incidentally, the grooved shape may be formed by applying any of the methods in Embodiments 7 to 9.

The liquid crystal display panel 51 has a configuration in which, in the CF substrate and the TFT array substrate, on the upper and lower sides (in the figure) of the center of each pixel, the grooves M are formed to extend horizontally in the figure, whereas on the left and right sides (in the figure) of the center of each pixel, the grooves M are formed to extend vertically in the figure. Consequently, the grooves M are formed in the shape of tetragons, with the center of the pixel as the center of each of the tetragons. Accordingly, the liquid crystal display panel 51 has the grooves M formed in a pattern which is symmetrical, on the vertical and horizontal directions in the figure, with respect to the center of the pixel. In addition, the liquid crystal molecules 15 are oriented so as to point the center of the pixel. Specifically, the liquid crystal molecules 15 on the upper and lower sides (in the figure) of the center of each pixel are oriented in the vertical direction in the figure, and the liquid crystal molecules 15 on the left and right sides (in the figure) of the center of each pixel are oriented in the horizontal direction in the figure.

Besides, in the TFT array substrate of the liquid crystal display panel 51, a tetragonal pyramidal projection is formed to protrude toward the CF substrate, at the center of one pixel. This makes the liquid crystal display panel 51 have a structure in which the tilt angle is gradually reduced as one goes from the center of one pixel toward the peripheries of the pixel. Consequently, in the liquid crystal display panel 51, the phase of light incident on the liquid crystal cell from the same polar angle will be substantially equal, even for different azimuth values, so that the liquid crystal display panel 51 has an enlarged angle of visibility.

According to this embodiment, by varying the extension direction of the grooves in each pixel, a desired angle of visibility can be secured.

Specifically, by forming the grooves M in a pattern which is symmetrical, on the vertical and horizontal direction in the figure, with respect to the center of each pixel, the angle of visibility can be enlarged. Incidentally, a configuration may be adopted in which each pixel is divided into a plurality of sub-pixels, and the grooves are formed in a pattern which is symmetrical with respect to the center of each sub-pixel.

Figure 36:
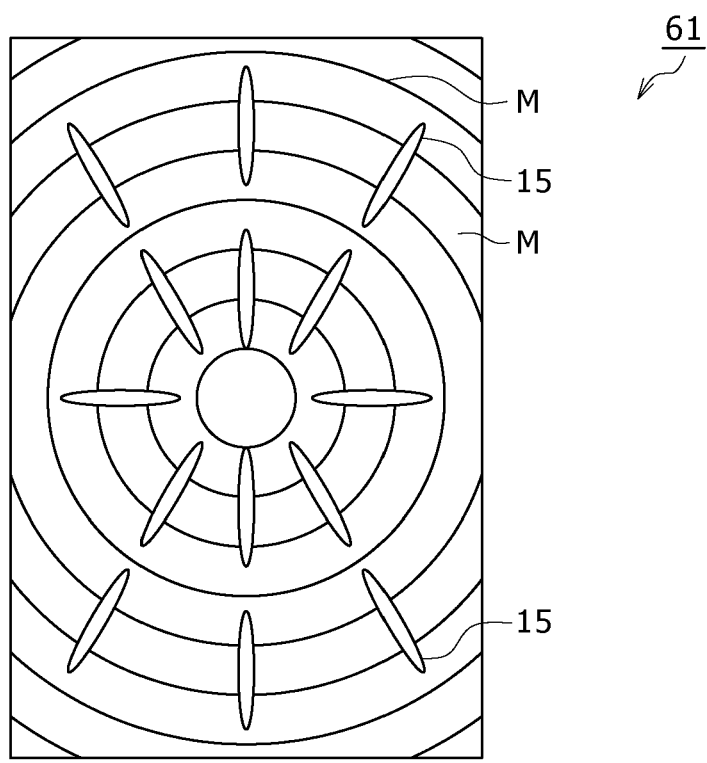
FIG. 36 is a schematic plan view showing the twelfth embodiment of the liquid crystal display according to the present invention.

FIG. 36 is a plan view showing a liquid crystal display panel applied to a liquid crystal display according to Embodiment 12 of the present invention, in contrast to FIG. 33. This liquid crystal display panel 16 is configured in the same manner as the liquid crystal display panel 15 in Embodiment 11 above, except that the grooves M are formed in the shape of concentric circles. In this case, a conical projection is provided at the center of one pixel, in place of the tetragonal pyramidal projection mentioned above.

According to this embodiment, with the grooves formed in the shape of concentric circles, also, the same effects as in Embodiment 11 above can be obtained.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display comprising:
a pair of substrates facing each other with a predetermined gap therebetween;
a liquid crystal in said gap, the liquid crystal including liquid crystal molecules;
an orientation layer, comprising at least one layer, carried on at least one of said substrates and which orients said liquid crystal molecules; and
an electrode carried on at least one of said substrates and effective to impart a voltage to said liquid crystal,
wherein,
said orientation layer includes a base layer which comprises a principal surface with a plurality of grooves in parallel, and a coating film covering said principal surface,
said coating film configured to orient an axis of each of said liquid crystal molecules parallel to at least one of said substrates in the condition where no voltage is impressed on said principal surface,
said grooves each extend along a predetermined direction, and are arrayed repeatedly at a given pitch and depth along a direction which is orthogonal to said predetermined direction,
a portion of said base layer along said orthogonal direction has a recess-and-protuberance structure in which recessed parts each corresponding to the bottom of each said groove and protuberant parts each corresponding to the boundary of the adjacent grooves appear alternately and repeatedly, and
the width of said protuberant part is smaller than the width of said recessed part.

2. The liquid crystal display as set forth in claim 1, wherein the width of said protuberant part is set to be smaller than the width of said recessed part to such an extent that the flatness of a top surface of said protuberant part is lost.

3. The liquid crystal display as set forth in claim 2, wherein said protuberant part is made to lose completely the flatness of the top surface thereof to be inverted V-shaped in cross section, whereas said recessed part is U-shaped in cross section while retaining flatness of a bottom surface thereof.

4. The liquid crystal display as set forth in claim 1, wherein the ratio of the depth of said grooves to the array pitch of said grooves is less than 1.

5. The liquid crystal display as set forth in claim 1, wherein said principal surface of said base layer is divided into a plurality of regions, and said predetermined direction of said grooves given to one region and that given to the adjacent region differ from each other.

6. A liquid crystal display comprising:
a pair of substrates facing each other with a predetermined gap therebetween;
a liquid crystal in said gap, the liquid crystal including liquid crystal molecules;
an orientation layer, comprising at least one layer, carried on at least one of said substrates and which orients said liquid crystal molecules; and an electrode carried on at least one of said substrates and effective to impart a voltage to said liquid crystal,
wherein,
said orientation layer includes a base layer which comprises a principal surface with a plurality of grooves in parallel, and a coating film covering said principal surface,
said coating film configured to orient an axis of each of said liquid crystal molecules parallel to at least one substrate in the condition where no voltage is impressed on said principal surface,
said grooves each extend along a predetermined direction, and are arrayed repeatedly at a given pitch and depth along a direction which is orthogonal to said predetermined direction,
a portion of said base layer along said orthogonal direction has a recess-and-protuberance structure in which recessed parts each corresponding to the bottom of each said groove and protuberant parts each corresponding to the boundary of the adjacent grooves appear alternately and repeatedly, and
the width of said protuberant part is set to be smaller than the width of said recessed part.

7. A liquid crystal display comprising:
a pair of substrates facing each other with a predetermined gap therebetween;
a liquid crystal in said gap, the liquid crystal including liquid crystal molecules;
an orientation layer comprising at least one layer carried on at least one of said substrates and which orients said liquid crystal molecules; and
an electrode carried on at least one of said substrates and effective to impart a voltage to said liquid crystal,
wherein,
said orientation layer includes a base layer with a plurality of grooves in parallel, and a coating film covering said grooves,
said grooves each extend along a predetermined direction, and are arrayed repeatedly at a given pitch and depth along a direction which is orthogonal to said predetermined direction,
said coating film configured to orient an axis of each of said liquid crystal molecules parallel to said substrates in the condition where no voltage is impressed, and
the aspect ratio indicative of the ratio of the depth of said grooves to the array pitch of said grooves is in the range between a lower limit of 0.05 and an upper limit of 0.5.

8. The liquid crystal display as set forth in claim 7, wherein said grooves are have an array pitch in the range of 1 to 5 μm and a groove depth in the range of 0.1 to 0.7 μm, and said molecular major axes of said liquid crystal are horizontally oriented in said orthogonal direction with respect to said grooves.

9. A liquid crystal display comprising:
a pair of substrates facing each other with a predetermined gap therebetween;
a liquid crystal in said gap, the liquid crystal including liquid crystal molecules;
an orientation layer comprising at least one layer carried on at least one of said substrates and which orients molecules of said liquid crystal; and
an electrode carried on at least one of said substrates and effective to impart a voltage to said liquid crystal,
wherein,
said orientation layer includes a base layer with a plurality of grooves in parallel, and a coating film covering said grooves,
said grooves each extend along a predetermined direction, and are arrayed repeatedly at a given pitch and depth along a direction which is orthogonal to said predetermined direction,
said coating film configured to orient an axis of each of said liquid crystal molecules parallel to said substrates in the condition where no voltage is impressed,
the aspect ratio indicative of the ratio of the depth of said grooves to the array pitch of said grooves has a lower limit and an upper limit,
said axes of each of said liquid crystal molecules are horizontally oriented in said predetermined direction when said aspect ratio is above said upper limit,
said axes of each of said liquid crystal molecules are horizontally oriented in said orthogonal direction with respect to said grooves when said aspect ratio is in the range of from said lower limit to said upper limit, and
said plurality of grooves are formed in said base layer so that said aspect ratio fall within the range of from said lower limit to said upper limit.

10. The method of manufacturing a liquid crystal display as set forth in claim 9, wherein said plurality of grooves are formed in said base layer so that said aspect ratio fall within the range between a lower limit of 0.05 and an upper limit of 0.5.

11. The method of manufacturing a liquid crystal display as set forth in claim 9, wherein said grooves are formed to have an array pitch in the range of 1 to 5 μm and a groove depth in the range of 0.1 to 0.7 μm so that said molecular major axes of said liquid crystal are horizontally oriented in said orthogonal direction with respect to said grooves.

* * * * *